United States Patent
Iwakiri et al.

(10) Patent No.: US 8,461,544 B2
(45) Date of Patent: Jun. 11, 2013

(54) RADIATION IMAGE CAPTURING DEVICE, AND RADIATION IMAGE CAPTURING SYSTEM

(75) Inventors: Naoto Iwakiri, Kanagawa (JP); Yasunori Ohta, Kanagawa (JP); Futoshi Yoshida, Kanagawa (JP); Haruyasu Nakatsugawa, Kanagawa (JP); Naoyuki Nishino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 314 days.

(21) Appl. No.: 12/868,755

(22) Filed: Aug. 26, 2010

(65) Prior Publication Data

US 2011/0073767 A1   Mar. 31, 2011

(30) Foreign Application Priority Data

Sep. 30, 2009   (JP) ................................. 2009-228868

(51) Int. Cl.
*G01T 1/24* (2006.01)
(52) U.S. Cl.
USPC .................................................. 250/370.09
(58) Field of Classification Search
USPC .................................................. 250/370.09
See application file for complete search history.

(56) References Cited

U.S. PATENT DOCUMENTS

| | | | |
|---|---|---|---|
| 2007/0029492 A1* | 2/2007 | Abe | 250/370.09 |
| 2008/0054182 A1* | 3/2008 | Yokoyama et al. | 250/370.09 |
| 2009/0154648 A1* | 6/2009 | Watanabe | 378/116 |

FOREIGN PATENT DOCUMENTS

| | | |
|---|---|---|
| JP | 2002-199388 A | 7/2002 |
| JP | 2005-000470 A | 1/2005 |
| JP | 2005-006979 A | 1/2005 |
| JP | 2005-181922 A | 7/2005 |
| JP | 2007-044068 A | 2/2007 |
| JP | 2007-127414 A | 5/2007 |
| JP | 2008-083031 A | 4/2008 |

* cited by examiner

*Primary Examiner* — Constantine Hannaher
(74) *Attorney, Agent, or Firm* — SOLARIS Intellectual Property Group, PLLC

(57) ABSTRACT

A radiation image capturing device has: a radiation image capturing section that is adapted to image capturing in a selected operation mode, an image processing section, a power supply section that supplies electric power for driving to the radiation image capturing section, a connection portion that electrically connects to at least one of a power supply device or an image processing device, and a control section. The control section effects control such that, in a case in which an operation mode that generates a predetermined generated heat amount or more is selected and the power supply device is connected to the connection portion, the power supply device is used instead of the power supply section, and, in a case in which an operation mode that generates a predetermined generated heat amount or more is selected and the image processing device is connected to the connection portion, the image processing device is used instead of the image processing section.

20 Claims, 14 Drawing Sheets

FIG.5

IMAGE CAPTURING ORDER INFORMATION

| PATIENT INFORMATION | | | | IMAGE CAPTURING MENU | | | | |
|---|---|---|---|---|---|---|---|---|
| NAME | ID | SEX | ... | IMAGED REGION | NUMBER OF IMAGES TO BE CAPTURED | POSTURE | OPERATION MODE | ... |
| TARO YAMADA | 01-001 | MALE | ... | ARM | 4 | STANDING | STILL IMAGE | ... |
| ICHIRO TANAKA | 01-002 | MALE | ... | ABDOMEN | — | LYING-DOWN | VIDEO | ... |
| ... | ... | ... | ... | ... | ... | ... | ... | ... |

CONNECTION TO THE EXTERNAL DEVICE BY A CABLE IS REQUIRED FOR THIS IMAGE CAPTURING. BECAUSE A CABLE IS NOT CONNECTED, THE OPERATION MODE IS LIMITED TO THE STILL IMAGE CAPTURING MODE.

AFTER MAKING THE PREDETERMINED PREPARATIONS, SELECT THE EXECUTE IMAGE CAPTURING BUTTON.

EXECUTE IMAGE CAPTURING

FIG. 15

| OPERATION SWITCHING INFORMATION | | | POWER SUPPLY SYSTEM | | IMAGE PROCESSING SYSTEM | | | | WIRELESS COMMUNICATION SYSTEM | | | WIRED COMMUNICATION SYSTEM | | | EXTERNAL POWER SUPPLY CONVERTING SYSTEM |
|---|---|---|---|---|---|---|---|---|---|---|---|---|---|---|---|
| | | | | | | | | | REGION | | | | | | |
| OPERATION MODE | | TYPE | BATTERY | VOLTAGE CONVERTING SECTION | BUFFER MEMORY | CORRECTION PROCESSING SECTION | IMAGE PROCESSING SECTION | CORRECTION DATA MEMORY | BUFFER MEMORY | FORMAT CONVERTING SECTION | WIRELESS COMMUNICATION SECTION | BUFFER MEMORY | FORMAT CONVERTING SECTION | WIRED COMMUNICATION SECTION | VOLTAGE CONVERTING SECTION |
| STILL IMAGE CAPTURING | | A | ○ | ○ | ○ | ○ | ○ | ○ | ○ | ○ | ○ | × | × | × | (×) |
| | | B | ○ | ○ | ○ | ○ | ○ | ○ | ○ | ○ | ○ | ○ | ○ | × | (×) |
| VIDEO IMAGE CAPTURING | | A | × | × | × | × | × | × | × | × | ○ | ○ | ○ | ○ | (×) |
| | | B | × | × | × | × | × | × | × | × | ○ | ○ | ○ | ○ | (○) |
| | | C | × | × | × | × | × | × | ○ | ○ | × | ○ | ○ | ○ | (× or ○) |
| | | D | ○ | PARTIALLY ○ | × | × | × | × | × | × | × | ○ | ○ | ○ | (× or ○) |
| | | E | ○ | PARTIALLY ○ | × | × | × | × | × | × | × | ○ | ○ | ○ | (× or ○) |
| | | F | ○ | × | × | × | × | × | × | × | × | ○ | ○ | ○ | (× or ○) |
| URGENT | | | × | × | × or ○ | × or ○ | × or ○ | × or ○ | × or ○ | × or ○ | × or ○ | ○ or × | ○ or × | ○ or × | (○ or ×) |

○: Used
×: Not Used

RADIATION IMAGE CAPTURING DEVICE, AND RADIATION IMAGE CAPTURING SYSTEM

CROSS-REFERENCE TO RELATED APPLICATION

This application claims priority under 35 USC 119 from Japanese Patent Application No. 2009-228868 filed on Sep. 30, 2009, the disclosure of which is incorporated by reference herein.

BACKGROUND OF THE INVENTION

1. Field of the Invention

The present invention relates to a radiation image capturing device, and a radiation image capturing system. In particular, the present invention relates to a radiation image capturing device, and a radiation image capturing system, that capture radiation images expressed by radiation that has passed through an object of image capturing.

2. Description of the Related Art

Radiation detectors such as FPDs (Flat Panel Detectors), in which a radiation-sensitive layer is disposed on a TFT (Thin Film Transistor) active matrix substrate and that can convert radiation directly into digital data, and the like have been put into practice in recent years. Portable radiation image capturing devices (hereinafter also called "electronic cassettes"), that capture radiation images expressed by irradiated radiation by using such radiation detectors, have been put into practice. As methods of converting radiation in radiation detectors used in the electronic cassettes, there are an indirect-conversion method that converts radiation into light at a scintillator and thereafter converts the light into charges at a semiconductor layer of photodiodes or the like, and a direct-conversion method that converts radiation into charges at a semiconductor layer of amorphous silicon or the like, and the like. In these respective methods, there are various materials that can be used at the semiconductor layer.

In the case of capturing video images at this type of radiation image capturing device, the amount of heat that is generated is large as compared with a case in which still image capturing is carried out. As a result, the need to improve the cooling function arises, the size of the device increases, and the portability thereof deteriorates.

Examples of reasons why the amount of generated heat is greater in video image capturing than in still image capturing are: because image capturing is carried out continuously, the amount of heat generated per unit time at the electric circuits for carrying out voltage conversion and the power supply section that includes an incorporated battery is large, and the time period over which heat is generated is long; and, because it is necessary to improve the processing ability of the electric circuits that carry out image processing in real time on the image information obtained by video image capturing, there is the need to use circuits whose amount of generated heat is great (circuits whose frequency of the clock signals used for synchronous control is high or whose circuit scale is large) as compared with electric circuits that are used for still image capturing.

Japanese Patent Application Laid-Open (JP-A) No. 2005-181922 discloses an X-ray image capturing device that detects X-rays that have passed through a subject by a planar X-ray detector. The X-ray image capturing device has a housing that incorporates the planar X-ray detector therein, and a cooling unit that suppresses a rise in temperature of the housing interior. The cooling unit is structured so to as to be detachable with respect to the exterior of the housing.

JP-A No. 2007-44068 discloses an image capturing device having a solid-state pickup element that is sensitive to X-rays. The image capturing device includes a pickup unit that receives X-rays and converts the received X-rays into image signals, a control unit that carries out control of the image capturing device including the image capturing using the pickup unit, and a communication unit having at least two or more communication interfaces for outputting the image signals acquired at the pickup unit.

JP-A No. 2007-127414 discloses a radiation image detector that detects radiation irradiated toward a subject and acquires radiation image information. The radiation image detector is provided with two or more structures among the following structures: a communication section that transmits the image data of the radiation image to an external device; a connection terminal that is connected either directly or indirectly to the external device and is for transmitting the image data of the radiation image to the external device; a storage unit that is detachable and that stores the image data. The radiation image detector also has a control section that judges whether the image data of the radiation image is to be transmitted from the communication section, or is to be transmitted from the connection terminal, or is to be transmitted from the storage unit. On the basis of the results of this judgment, the control section switches the method of transmitting the image data of the radiation image to the external device.

JP-A No. 2005-6979 discloses a radiation image capturing device having, at a device main body: a battery; a digital image capturing section that captures a radiation image as a digital image; a wired communication section that transmits and receives digital image data or image capturing control signals via a cable to and from the exterior of the device main body; a wireless communication section that wirelessly transmits and receives digital image data or image capturing control signals to and from the exterior of the device main body without going through a cable; a connection sensing section that senses connection of the cable to the device main body; a communication selecting section that selects, on the basis of the results of sensing of the connection sensing section, which of the wired communication section and the wireless communication section is to carry out transmitting and receiving of the digital image data and the image capturing control signals; and a power supply selecting section that selects, on the basis of the results of sensing of the connection sensing section, whether or not the battery is to be used as the power supply of the device main body.

JP-A No. 2002-199388 discloses an X-ray image capturing device formed from: a two-dimensional array sensor that receives an X-ray image; a drive unit that drives the sensor in accordance with control signals originating from an X-ray generating device; an amp unit that, by the drive unit, selects matrices within the sensor and amplifies the data of the respective matrices; an AD unit digitally converting the output from the amp unit; a unit that serializes the image data that has successively been digitalized at the AD unit and the drive unit; an X-ray image capturing section that is structured from a transfer unit that transfers the serialized image data; a unit that de-serializes image data transferred by the transfer unit; and a PC for control that is structured from a unit that disposes the de-serialized image data within a frame memory. The transfer unit, that transfers signals between the X-ray image capturing section and the PC for control, is a transfer unit formed from an optical fiber cable that transfers optical signals obtained by converting the serialized image data from electricity to light, and a metal cable that transfers control signals that originate from the X-ray generating device and the PC for control, or that the drive unit response-originates.

JP-A No. 2005-470 discloses an X-ray image capturing device that irradiates X-rays that are generated by an X-ray generating unit onto a subject, and detects, at a sensor, the X-ray distribution that is transmitted through the subject. The X-ray image capturing device has: an X-ray detection unit having a detection surface at which plural detecting elements are disposed two-dimensionally; an X-ray irradiation unit that irradiates X-rays with respect to the X-ray detection unit; a first supporting mechanism that supports the X-ray detection unit; and a second supporting mechanism that supports the X-ray irradiation unit. The X-ray detection unit is detachable with respect to the first supporting mechanism. The X-ray detection unit has a control unit such that images can be captured in a state in which the X-ray detection unit is separated from the first supporting mechanism. The second supporting mechanism has a moving mechanism that, in a state in which the X-ray detection unit is fixed to the first supporting mechanism, fixes the X-ray irradiation unit in a first direction facing the X-ray detection unit, and, in a state in which the X-ray detection unit is separated from the first supporting mechanism, enables the X-ray irradiation unit to irradiate X-rays in other than the first direction.

JP-A No. 2008-83031 discloses an electronic cassette type radiation detecting device having a sensor array that includes plural sensors that detect incident radiation. The electronic cassette type radiation detecting device has a connection section that connects with an additional function module that is detachable, and has a selection unit that, due to the additional function module being connected, switches to a state in which the image capturing mode can be selected from among still image capturing and video image capturing.

SUMMARY OF THE INVENTION

The present invention has been made in view of the above circumstances and provides a radiation image capturing device, and a radiation image capturing system.

According to an aspect of the invention, there is provided a radiation image capturing device including: a radiation image capturing section that is adapted to capture, in an operation mode selected from among a plurality of operation modes that are determined in advance, of a radiation image expressed by radiation that has passed through a subject of image capturing; an image processing section that carries out predetermined image processing on image information obtained by image capturing by the radiation image capturing section; a power supply section that supplies electric power for driving to the radiation image capturing section; a connection portion that electrically connects to at least one of a power supply device, that is adapted to supply electric power for driving to the radiation image capturing section, and an image processing device, that carries out same sort of image processing as the image processing section; and a control section that effects control such that, in a case in which an operation mode that generates a predetermined generated heat amount or more has been selected as the operation mode and the power supply device is connected to the connection portion, the power supply device is used instead of the power supply section, and, in a case in which an operation mode that generates a predetermined generated heat amount or more has been selected as the operation mode and the image processing device is connected to the connection portion, the image processing device is used instead of the image processing section.

BRIEF DESCRIPTION OF THE DRAWINGS

Preferred exemplary embodiments of the present invention will be described in detail based on the following figures, wherein:

FIG. 5 is a schematic drawing showing the structure of image capturing order information relating to the exemplary embodiments;

FIG. 13 is a schematic drawing showing an example of information displayed by execution of the radiation image capturing processing program relating to the second exemplary embodiment;

FIG. 15 is a drawing provided for explanation of the modified example of the exemplary embodiments, and is a schematic drawing showing examples of operation switching information.

DETAILED DESCRIPTION OF THE INVENTION

Exemplary embodiments of the present invention will be described in detail hereinafter with reference to the drawings.

In the above-described technique disclosed in JP-A No. 2005-181922, the cooling unit must be readied in advance, and the cost increases. Further, at the radiation image capturing device, the cooling unit must be structured so as to be detachable, and the structure of the device becomes complex.

In the above-described techniques disclosed in JP-A Nos. 2007-44068, 2007-127414, 2005-6979, 2002-199388, 2005-470 and 2008-83031, no particular mention is made of suppressing the amount of heat generated at the image capturing device, and these techniques cannot suppress the amount of heat that is generated.

The present invention provides a radiation image capturing device, a radiation image capturing system, and a computer readable medium storing a program that can suppress the amount of generated heat without leading to an increase in costs and the device becoming complex and large.

Exemplary embodiments of the present invention will be described in detail hereinafter with reference to the drawings. Description will be given of examples of forms in cases in which the present invention is applied to a radiology information system that is a system that collectively manages information that is handled in the radiology department of a hospital.

First Exemplary Embodiment

Figure 1:
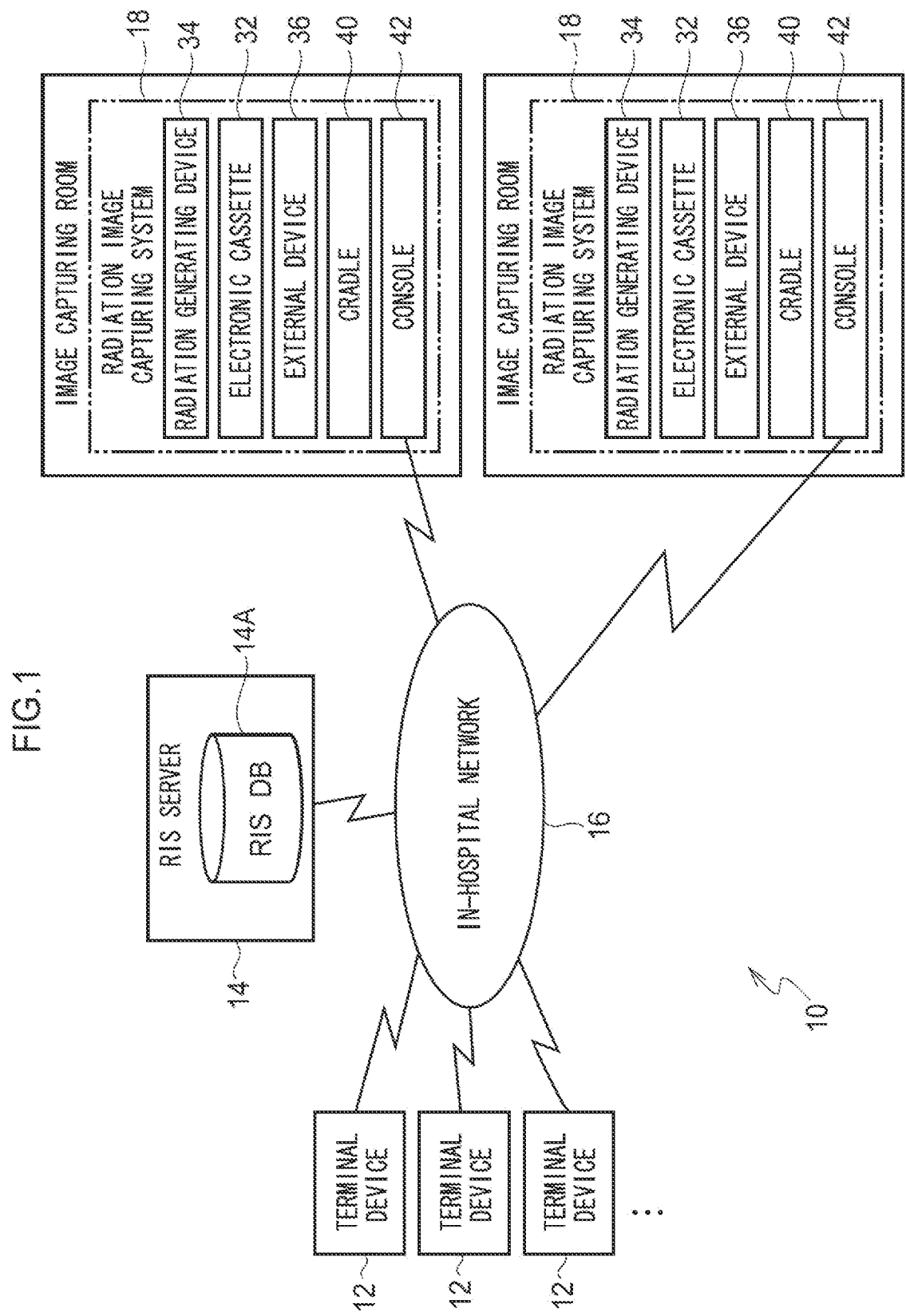
FIG. 1 is a block diagram showing the structure of a radiology information system relating to the exemplary embodiments.

The structure of a radiology information system 10 (hereinafter called "RIS") relating to the present exemplary embodiment will be described with reference to FIG. 1.

The RIS 10 is a system for carrying out information management such as scheduling of examinations/treatments, recording of diagnoses, and the like in a radiology department. The RIS 10 structures a part of a hospital information system (hereinafter called "HIS").

The RIS 10 has plural image capturing request terminal devices (hereinafter called "terminal devices") 12, an RIS server 14, and radiation image capturing systems (hereinafter called "image capturing systems") 18 that are individually set in radiation image capturing rooms (or operating rooms) within the hospital. The terminal devices 12, the RIS server 14 and the image capturing systems 18 are respectively connected to an in-hospital network 16 that is formed from a wired or wireless LAN (Local Area Network) or the like. The RIS 10 structures a part of the HIS that is provided within the same hospital. An HIS server (not illustrated) that manages the entire HIS also is connected to the in-hospital network 16.

The terminal device 12 is for a doctor or a radiologic technologist to carrying out inputting, browsing, and the like of diagnostic information and reservations of facilities. Requests for image capturing of radiation images and reservations for image capturing are also made via the terminal device 12. Each of the terminal devices 12 is structured to include a personal computer having a display device, and can communicate back and forth with the RIS server 14 via the in-hospital network 16.

The RIS server 14 accepts image capturing requests from the respective terminal devices 12, and manages the image capturing schedule of radiation images at the image capturing systems 18. The RIS server 14 is structured to include a database 14A.

The database 14A includes information relating to a patient (hereinafter called "patient information") such as attribute information of the patient (name, ID, sex, birthdate, age, blood type, weight, and the like), the patient's history of past illness, history of past examinations/treatments, radiation images that were captured in the past, and the like. The database 14A further includes information relating to electronic cassettes 32 that will be described later and that are used in the image capturing systems 18, such as the ID number, type, size, sensitivity, regions to be imaged at which the electronic cassette 32 can be used (contents of image capturing requests that the electronic cassette 32 can handle), the usage start date, number of times of usage, and the like of the electronic cassette 32. The database 14A also includes environment information expressing the environments in which radiation images are captured by using the electronic cassettes 32, i.e., environments in which the electronic cassettes 32 are used (as examples, a radiation image capturing room, an operating room, or the like).

Also included in the database 14A is an image capturing menu that is information expressing the region that is the object of capturing of a radiation image in the body of the patient (hereinafter called "imaged region"), the number of images to be captured, the posture of the patient at the time of image capturing (standing or laying down in the present exemplary embodiment), the operation mode of the electronic cassette 32 at the time of capturing the radiation image, and conditions at the time of carrying out the radiation image capturing such as the direction of irradiating the radiation with respect to the patient and the like. In the image capturing system 18 relating to the present exemplary embodiment, two types of modes that are a still image capturing mode, that is the operation mode at the time of carrying out capturing of still images, and a video image capturing mode, that is the operation mode at the time of carrying out capturing of video images, are readied as operation modes of the electronic cassette 32. In the electronic cassette 32 relating to the present exemplary embodiment, 30 (frames/sec) is used as the image capturing speed by the video image capturing mode, but the present invention is not limited to the same and may, of course, be a form that uses another image capturing speed such as 60 (frames/sec) or the like.

The image capturing system 18 carries out capturing of radiation images by the operation of a doctor or a radiologic technologist in accordance with instructions from the RIS server 14. The image capturing system 18 has a radiation generating device 34, the electronic cassette 32, an external device 36, a cradle 40, and a console 42 (see FIG. 4). The radiation generating device 34 irradiates, from a radiation source 130 (see FIG. 2) and onto a patient, radiation X (see FIG. 3) of a radiation amount according to exposure conditions. The electronic cassette 32 incorporates therein a radiation detector 60 (see FIG. 3) that absorbs the radiation X that has been transmitted through the imaged region of the patient, and generates charges, and, on the basis of the generated charge amount, generates image information expressing a radiation image. The external device 36 is connected to the electronic cassette 32 at the time of capturing video images. The cradle 40 charges a battery that is incorporated in the electronic cassette 32. The console 42 controls the electronic cassette 32, the radiation generating device 34, and the cradle 40.

The console 42 acquires, from the RIS server 14, various types of information that are included in the database 14A, and stores the information in an HDD 110 (see FIG. 4) that will be described later. On the basis of this information, the console 42 controls the electronic cassette 32, the radiation generating device 34, and the cradle 40.

Figure 2:
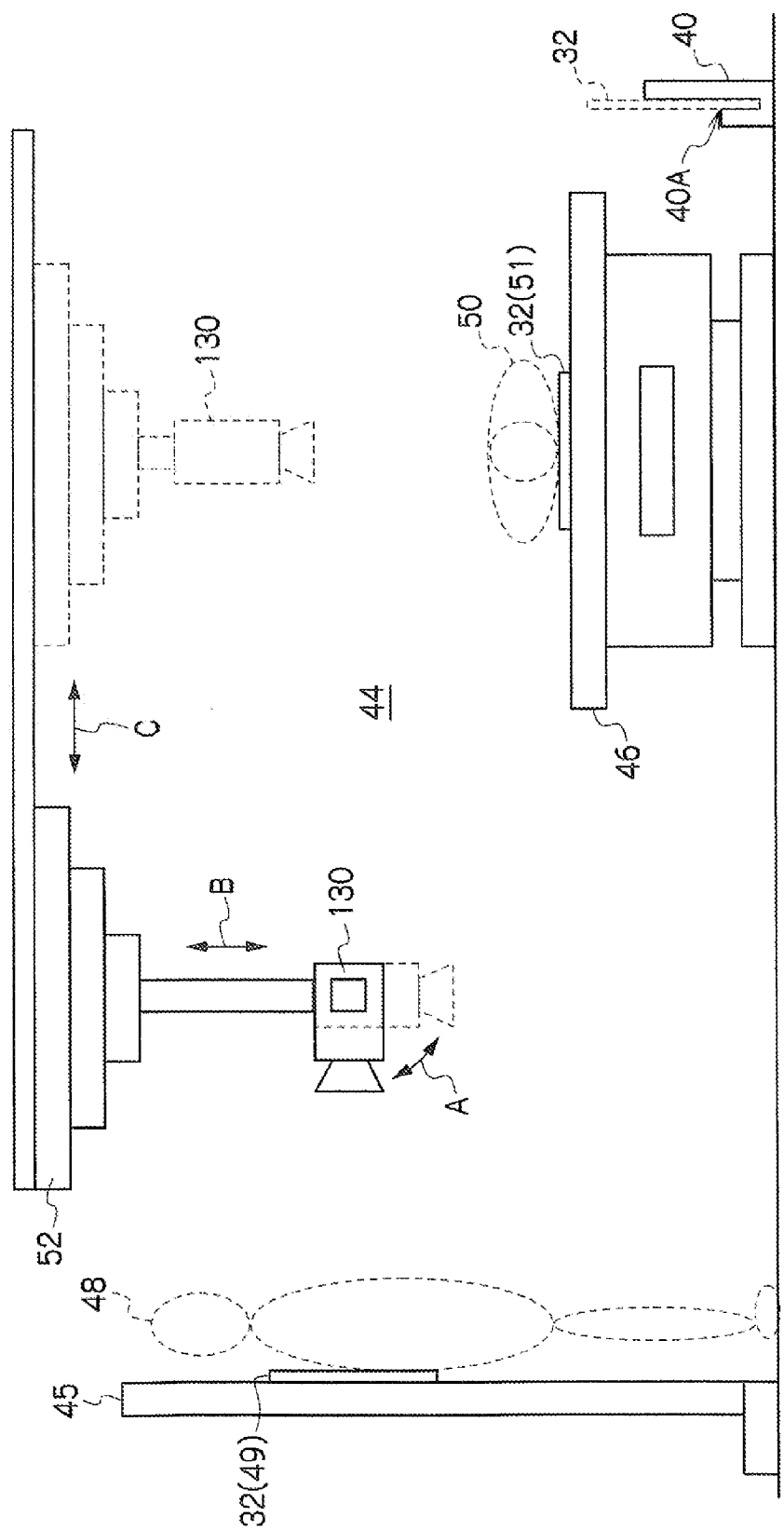
FIG. 2 is a side view showing an example of an arranged state, in a radiation image capturing room, of a radiation image capturing system relating to the exemplary embodiments.

An example of the arranged state, in a radiation image capturing room 44, of the image capturing system 18 relating to the present exemplary embodiment is shown in FIG. 2.

A rack 45, that is for holding the electronic cassette 32 when radiation image capturing in a standing state is carried out, and a bed 46, that is for a patient to lay upon when radiation image capturing in a lying-down state is carried out, are set in the radiation image capturing room 44. The space in front of the rack 45 is an image capturing position 48 for the patient when radiation image capturing in the standing state is carried out. The space above the bed 46 is an image capturing position 50 for the patient when radiation image capturing in a lying-down state is carried out.

Further, a supporting/moving mechanism 52, that supports the radiation source 130 such that the radiation source 130 is rotatable around a horizontal axis (the direction of arrow A in FIG. 2), is movable in the vertical direction (the direction of arrow B in FIG. 2), and is movable in the horizontal direction (the direction of arrow C in FIG. 2), is provided in the radiation image capturing room 44 in order to make both radiation image capturing in the standing state and radiation image capturing in the lying-down state possible by radiation from the single radiation source 130. The supporting/moving mechanism 52 has a driving source that rotates the radiation source 130 around the horizontal axis, a driving source that moves the radiation source 130 in the vertical direction, and a driving source that moves the radiation source 130 in the horizontal direction (none of these driving sources is illustrated).

An accommodating portion 40A, in which the electronic cassette 32 can be accommodated, is formed in the cradle 40.

Charging of the battery incorporated in the electronic cassette 32 is carried out in the state in which the electronic cassette 32 is accommodated in the accommodating portion 40A of the cradle 40 when the electronic cassette 32 is not in use. When radiation images are to be captured, the electronic cassette 32 is removed from the cradle 40 by a radiologic technologist or the like. If the image capturing posture is the standing posture, the electronic cassette 32 is positioned at a position 49, or the like, that is determined in advance and is held at the rack 45. If the image capturing posture is the lying-down posture, the electronic cassette 32 is positioned at a position 51, or the like, that is determined in advance and is located beneath the region that is the object of image capturing and on the bed 46.

Although not illustrated in FIG. 2, other than these devices, the external device 36 and the console 42 are set in the radiation image capturing room 44. The electronic cassette 32 is not used only in a radiation image capturing room or an operating room, and, due to the portability thereof can, for example, be used in medical examinations or in doctors' rounds within a hospital or the like as well.

Figure 3:
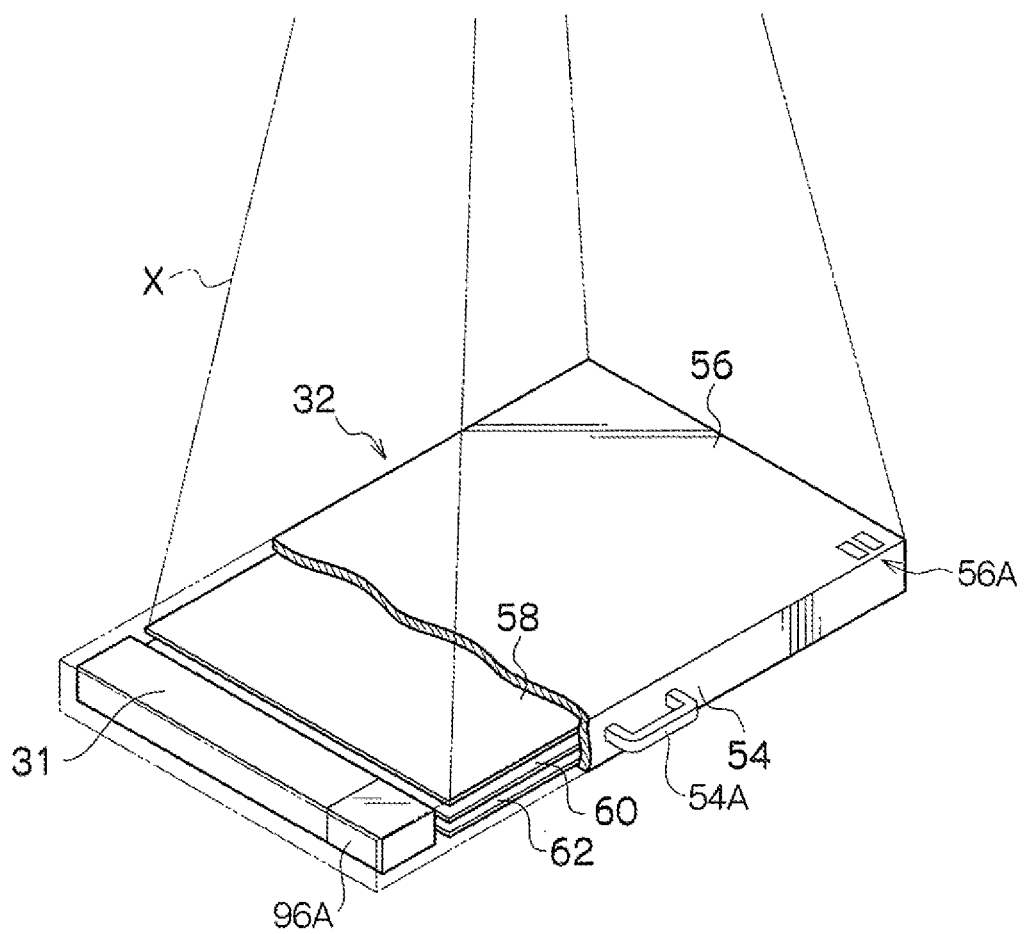
FIG. 3 is a transparent perspective view showing the internal structure of an electronic cassette relating to the exemplary embodiments.

The internal structure of the electronic cassette 32 relating to the present exemplary embodiment is shown in FIG. 3.

The electronic cassette 32 has a housing 54 formed from a material through which the radiation X is transmitted, and is a structure that is waterproof and airtight. When the electronic cassette 32 is being used in an operating room or the like, there is the concern that blood or other various germs will adhere thereto. Thus, the electronic cassette 32 is made to be a waterproof and airtight structure, and is disinfectingly cleaned as needed. The one electronic cassette 32 can thereby be used repeatedly in continuation.

A grid 58 that removes the scattered radiation of the radiation X due to the patient, the radiation detector 60 that detects the radiation X that has been transmitted through the patient, and a lead plate 62 that absorbs the back-scattered radiation of the radiation X, are disposed within the housing 54 in that order from an irradiated surface 56 side of the housing 54 onto which the radiation X is irradiated. The irradiated surface 56 of the housing 54 may be structured as the grid 58.

A case 31, that accommodates electronic circuits including a microcomputer and accommodates a battery 96A that is chargeable and removable, is disposed at one end side of the interior of the housing 54. The radiation detector 60 and the electronic circuits are operated by electric power that is supplied from the battery 96A disposed in the case 31. In order to avoid damage, that accompanies the irradiation of the radiation X, to the various types of circuits that are accommodated within the case 31, it is preferable to place a lead plate or the like at the irradiated surface 56 side of the case 31. The electronic cassette 32 relating to the present exemplary embodiment is a parallelepiped at which the shape of the irradiated surface 56 is rectangular, and the case 31 is disposed at one end portion in the longitudinal direction thereof.

A display portion 56A, that carries out display showing the on/off state of an unillustrated power supply switch (the power state) and the operating mode that is a "ready state" or "currently transmitting data", and carries out display showing the operating state of the electronic cassette 32 such as the state of the remaining capacity of the battery 96A or the like, is provided at a predetermined position of an outer wall of the housing 54. Although light-emitting diodes are used as the display portion 56A at the electronic cassette 32 relating to the present exemplary embodiment, the present invention is not limited to the same, and may be light-emitting elements other than light-emitting diodes, or may be another display unit such as a liquid crystal display, an organic EL display, or the like.

A handle 54A, that is grasped when the electronic cassette 32 is moved, is provided at a predetermined position of an outer wall of the housing 54. At the electronic cassette 32 relating to the present exemplary embodiment, the handle 54A is provided at the central portion of a side wall of the housing 54, which side wall extends in the longitudinal direction of the irradiated surface 56. However, the present invention is not limited to the same. For example, the handle 54A may be disposed at the central portion of a side wall that extends in the direction of the short side of the irradiated surface 56, or at a position that is offset from the central portion of either of these side walls by a distance that takes into consideration the offset of the center of gravity position of the electronic cassette 32, or at another position.

The main structures of the electrical system of the image capturing system 18 relating to the present exemplary embodiment will be described with reference to FIG. 4.

The radiation detector 60 is incorporated within the electronic cassette 32 relating to the present exemplary embodiment. The radiation detector 60 is structured by layering a photoelectric conversion layer, that absorbs the radiation X and converts the radiation X into charges, on a TFT active matrix substrate 66. The photoelectric conversion layer is formed from amorphous a-Se (amorphous selenium) whose main component is, for example, selenium (e.g., a content of greater than or equal to 50%). When the radiation X is irradiated, the photoelectric conversion layer converts the irradiated radiation X into charges by generating, at the interior thereof, charges (pairs of electrons and holes) of a charge amount corresponding to the irradiated radiation amount. Note that, instead of a radiation-charge conversion material that directly converts the radiation X into charges such as amorphous selenium, the radiation detector 60 may convert the radiation X into charges indirectly by using a fluorescent material and photoelectric conversion elements (photodiodes). Gadolinium oxysulfide (GOS) and cesium iodide (CsI) are well known as fluorescent materials. In this case, conversion from the radiation X into light is carried out by the fluorescent material, and the conversion from light into charges is carried out by the photodiodes that are the photoelectric conversion elements.

Numerous storage capacitors 68, that accumulate the charges generated at the photoelectric conversion layer, and pixel portions 74, that have TFTs 70 for reading-out the charges accumulated in the storage capacitors 68, are arranged in the form of a matrix on the TFT active matrix substrate 66. In FIG. 4, the photoelectric conversion layer corresponding to the individual pixel portions 74 is shown schematically as photoelectric conversion portions 72. The charges, that are generated at the photoelectric conversion layer accompanying the irradiation of the radiation X onto the electronic cassette 32, are accumulated in the storage capacitors 68 of the individual pixel portions 74. Due thereto, the image information, that is carried by the radiation X irradiated on the electronic cassette 32, is converted into charge information and is held at the radiation detector 60.

Plural gate lines 76, that extend in a given direction (the row direction) and are for turning the TFTs 70 of the individual pixel portions 74 on and off, and plural data lines 78, that extend in a direction (the column direction) orthogonal to the gate lines 76 and are for reading-out the accumulated charges from the storage capacitors 68 via the TFTs 70 that have been turned on, are provided at the TFT active matrix substrate 66. The individual gate lines 76 are connected to a gate line driver 80, and the individual data lines 78 are connected to a signal processing section 82. When charges are accumulated in the storage capacitors 68 of the individual pixel portions 74, the TFTs 70 of the individual pixel portions 74 are turned on in order in units of rows by signals supplied from the gate line driver 80 via the gate lines 76. The charges, that are accumulated in the storage capacitors 68 of the pixel portions 74 whose TFTs 70 have been turned on, are transferred through the data lines 78 as analog electrical signals and are inputted to the signal processing section 82. Accordingly, the charges, that are accumulated in the storage capacitors 68 of the individual pixel portions 74, are read-out in order in units of rows.

Although not illustrated, the signal processing section 82 is equipped with an amplifier and a sample hold circuit that are provided for each of the individual data lines 78. The charge signals that are transferred through the individual data lines 78 are amplified at the amplifiers, and thereafter, are held in the sample hold circuits. A multiplexer and an A/D (analog/digital) converter are connected in that order to the output sides of the sample hold circuits. The charge signals, that are held in the individual sample hold circuits, are inputted in order (serially) to the multiplexer, and are converted into digital image data by the A/D converter.

A cassette control section 92, that controls the overall operation of the electronic cassette 32, is provided at the electronic cassette 32 relating to the present exemplary embodiment. The cassette control section 92 is structured by a microcomputer, and has a CPU (Central Processing Unit) 92A, a memory 92B including a ROM (Read Only Memory) and a RAM (Random Access Memory), and a nonvolatile storage 92C formed by a HDD (Hard Disk Drive), a flash memory, or the like.

The gate line driver 80 and the signal processing section 82 are connected to the cassette control section 92. The cassette control section 92 controls the operations of the gate line driver 80 and the signal processing section 82. An image processing system block 20, a wireless communication system block 22, and a wired communication system block 24 are connected to the cassette control section 92. The cassette control section 92 controls the operations of the image processing system block 20, the wireless communication system block 22, and the wired communication system block 24.

A buffer memory 20A, a correction processing section 20B, a correction data memory 20C, and an image processing section 20D are provided at the image processing system block 20.

The input terminal of the buffer memory 20A is connected to the output terminal of the A/D converter at the signal processing section 82. The digital image data outputted from the A/D converter is stored in order in the buffer memory 20A. The buffer memory 20A has the storage capacity to be able to store the digital image data of plural frames. Each time capturing of a radiation image is carried out, the digital image data obtained by the image capturing is successively stored in the buffer memory 20A.

The output terminal of the buffer memory 20A is connected to one of the input terminals of the correction processing section 20A that has two inputs. The other input terminal of the correction processing section 20B is connected to the output terminal of the correction data memory 20C. By using correction data that is stored in the correction data memory 20C, the correction processing section 20B carries out predetermined image correction processings on the digital image data inputted from the buffer memory 20A. At the electronic cassette 32 relating to the present exemplary embodiment, shading correction and defective pixel correction are applied as the aforementioned predetermined image correction processings.

The output terminal of the correction processing section 20B, that outputs the digital image data on which the image correction processings have been carried out, is connected to the input terminal of the image processing section 20D. The image processing section 20D carries out predetermined image processings on the digital image data inputted from the correction processing section 20B. In the electronic cassette 32 relating to the present exemplary embodiment, gamma correction processing and noise removal processing are applied as the aforementioned predetermined image processings.

A buffer memory 22A, a format converting section 22B, and a wireless communication section 22C are provided at the wireless communications system block 22.

The input terminal of the buffer memory 22A is connected to the output terminal of the image processing section 20D that outputs the digital image data that has been subjected to the image processings. The digital image data outputted from the image processing section 20D is stored in order in the buffer memory 22A. In the same way as the buffer memory 20A, the buffer memory 22A also has the storage capacity to be able to store the digital image data of plural frames. Each time capturing of a radiation image is carried out, the digital image data obtained by the image capturing is successively stored in the buffer memory 22A.

The output terminal of the buffer memory 22A is connected to the input terminal of the format converting section 22B. The format converting section 22B carries out predetermined format converting processing on the digital image data inputted from the buffer memory 22A. At the electronic cassette 32 relating to the present exemplary embodiment, compression processing (reversible compression processing in the present exemplary embodiment) on the digital image data is applied as the aforementioned predetermined format converting processing.

The output terminal of the format converting section 22B, that outputs the digital image data that has been subjected to the format converting processing, is connected to the input terminal of the wireless communication section 22C. The wireless communication section 22C wirelessly transmits the digital image data that is inputted from the format converting section 22B.

The wireless communication section 22C relating to the present exemplary embodiment corresponds to wireless LAN (Local Area Network) standards exemplified by IEEE (Institute of Electrical and Electronics Engineers) 802.11a/b/g or the like. The wireless communication section 22C controls the transfer of various types of information to and from external devices by wireless communication. The cassette control section 92 can communicate wirelessly with the console 42 via the wireless communication section 22C, and can thereby transmit and receive various types of information to and from the console 42.

A buffer memory 24A, a format converting section 24B, a wired communication section 24C, and a power supply filter 24D are provided at the wired communication system block 24.

The input terminal of the buffer memory 24A is connected to the output terminal of the A/D converter at the signal processing section 82. The digital image data that is outputted from the A/D converter is stored in order in the buffer memory 24A as well. The buffer memory 24A also has the storage capacity to be able to store the digital image data of plural frames. Each time capturing of a radiation image is carried out, the digital image data obtained by the image capturing is successively stored in the buffer memory 24A.

The output terminal of the buffer memory 24A is connected to the input terminal of the format converting section 24B. The format converting section 24B carries out predetermined format converting processing on the digital image data inputted from the buffer memory 24A. At the electronic cassette 32 relating to the present exemplary embodiment, compression processing (reversible compression processing in the present exemplary embodiment) on the digital image data is applied as the aforementioned predetermined format converting processing, in the same way as at the format converting section 22B.

The output terminal of the format converting section 24B, that outputs the digital image data that has been subjected to the format converting processing, is connected to the input terminal of the wired communication section 24C. The wired communication section 24C transmits by wire the digital image data that is inputted from the format converting section 24B.

The wired communication section 24C relating to the present exemplary embodiment corresponds to USB (Universal Serial Bus) standards. The wired communication section 24C controls the transfer of various types of information to and from external devices by wired communication.

As described above, in addition to the still image capturing mode that carries out capturing of still images, the electronic cassette 32 relating to the present exemplary embodiment is also provided with a video image capturing mode that carries out capturing of video images. In a case in which video images are captured, high-speed data transfer is needed as compared with a case in which capturing of still images is carried out. For example, in a case in which the specifications at the time of carrying out video image capturing are 2048×2048 pixels×16 (bits/pixel)×30 (frames/sec), a data transfer speed of around 2 Gbps (bits per second) is needed. In a case in which the specifications at the time of carrying out video image capturing are 1536×1536 pixels×16 (bits/pixel)×30 (frames/sec), a data transfer speed of around 1.1 Gbps is needed.

However, in current wireless communications standards, there are no systems that can satisfy such data transfer speeds. For example, the data transfer speed of IEEE 802.11.a is 54 Mbps. Even with UWB (Ultra Wide Band), Wireless USB and the like, the data transfer speeds are 100 to 480 Mbps. The maximum transfer speed by IEEE 802.11n that is currently being ratified as a standard is 600 Mbps (the effective transfer speed is around 100 Mbps). Transfer speeds of 1 Gbps or more by next-generation IEEE 802.11vht (Very High Throughput) are currently being planned, but there is the possibility that the effective transfer speed will not be sufficient. Also with high-speed infrared communication Giga-IR that is being standardized by IrDA and uses an infrared laser of a maximum transfer speed of 1 Gbps, similarly, the data transfer speed is unsatisfactory.

Therefore, in the electronic cassette 32 relating to the present exemplary embodiment, USB 3.0 that has a data transfer speed of a maximum of 5 Gbps is used as the communication standard of the wired communication section 24C. When carrying out video image capturing, the digital image data obtained by capturing the video images is transmitted in real time via the wired communication section 24C to an external device. The communication standard of the wired communication section 24C is not limited to USB 3.0, and may be a form utilizing another communication standard that can transfer in real time image data that is obtained by video image capturing, such as a communication standard like 1000 Base-T, 10 GBase-T or the like, or optical fiber communication, or the like.

The power supply filter 24D provided at the wired communication system block 24 carries out filtering processing on the inputted electric power. In the electronic cassette 32 relating to the present exemplary embodiment, a passive common mode filter is used.

A connection terminal 26 is provided at the electronic cassette 32. The output terminal of the wired communication section 24C and the input terminal of the power supply filter 24D at the wired communication system block 24 are connected to the connection terminal 26. Accordingly, the wired communication section 24C carries out wired communication with an external device connected to the connection terminal 26, whereas electric power supplied from the external device connected to the connection terminal 26 is inputted to the power supply filter 24D.

A power supply section 96 is provided at the electronic cassette 32 relating to the present exemplary embodiment. The above-described various types of circuits and respective elements (the respective portions of the radiation detector 60, the gate line driver 80, the signal processing section 82, the image processing system block 20 and the wireless communication system block 22, and the microcomputer that functions as the cassette control section 92, and the like) operate by the electric power that is supplied from the power supply section 96.

The power supply section 96 incorporates therein the aforementioned battery (a secondary battery) 96A, a voltage converting section 96B that converts the voltage of the electric power outputted from the battery 96A into voltages that are needed at the respective portions that are electric power supply destinations, and a power supply filter 96C that carries out filtering processing on the electric power outputted from the voltage converting section 96B. The power supply section 96 supplies electric power to the aforementioned various types of circuits and respective elements from the charged battery 96A via the voltage converting section 96B and the power supply filter 96C. The wiring that connects the power supply section 96 and the aforementioned various types of circuits and respective elements is omitted from FIG. 4.

A lithium ion battery is used as the battery 96A in the electronic cassette 32 relating to the present exemplary embodiment. However, the present invention is not limited to the same, and may be a form in which another secondary battery such as a nickel hydrogen battery, a nickel cadmium battery, or the like is used. In the electronic cassette 32 relating to the present exemplary embodiment, a passive common mode filter can be used for the power supply filter 96C as well, in the same way as the power supply filter 24D.

The power supply filter 24D is structured similarly to the power supply filter 96C. The output terminal of the power supply filter 24D also is connected to the aforementioned various types of circuits and respective elements, in the same way as the power supply filter 96C.

As described above, in the electronic cassette 32 relating to the present exemplary embodiment, two modes that are the still image capturing mode and the video image capturing mode are readied as the operation modes. However, in a case of carrying out video image capturing by using the incorporated power supply section 96 and image processing system block 20, greater than or equal to a predetermined amount of generated heat (in the present exemplary embodiment, an amount of generated heat that is such that the surface temperature of the electronic cassette 32 becomes 42° C.) is generated.

This is because, as compared with a case of carrying out still image capturing, in a case in which video image capturing is carried out, high-speed data transfer is needed as described above, and therefore, the voltage of the electric power supplied from the battery 96A must be made to be greater, and the frequency of the clock signals for synchronous control that are inputted to the respective sections must be made to be higher.

However, in radiation image capturing, and in video image capturing in particular, it is often the case that the patient contacts the electronic cassette 32 over a long period of time, and therefore, burns (including low-temperature burns) must be prevented. To this end, the surface temperature of the electronic cassette 32 must be kept to less than or equal to 42° C. Deterioration of proteins begins at around 42° C., and low-temperature burns also start from around 42° C. The higher the temperature, the shorter the period of time unit low-temperature burns are caused. It is said that low-temperature burns arise in around six hours at 44° C., and in around three hours at 45° C., and in around 1.5 hours at 46° C., and in around 30 seconds at 55° C.

Therefore, at the image capturing system 18 relating to the present exemplary embodiment, the external device 36 is readied that has the function of being able to supply electric power to the respective electric power supply destinations of the electronic cassette 32, and has functions that are similar to those of the image processing system block 20 of the electronic cassette 32. When video image capturing is to be carried out by the electronic cassette 32, the external device 36 is connected to the electronic cassette 32, and some of the functions of the electronic cassette 32 are made to be taken-over by the external device 36. The amount of heat generated by the electronic cassette 32 is thereby suppressed.

Figure 4:
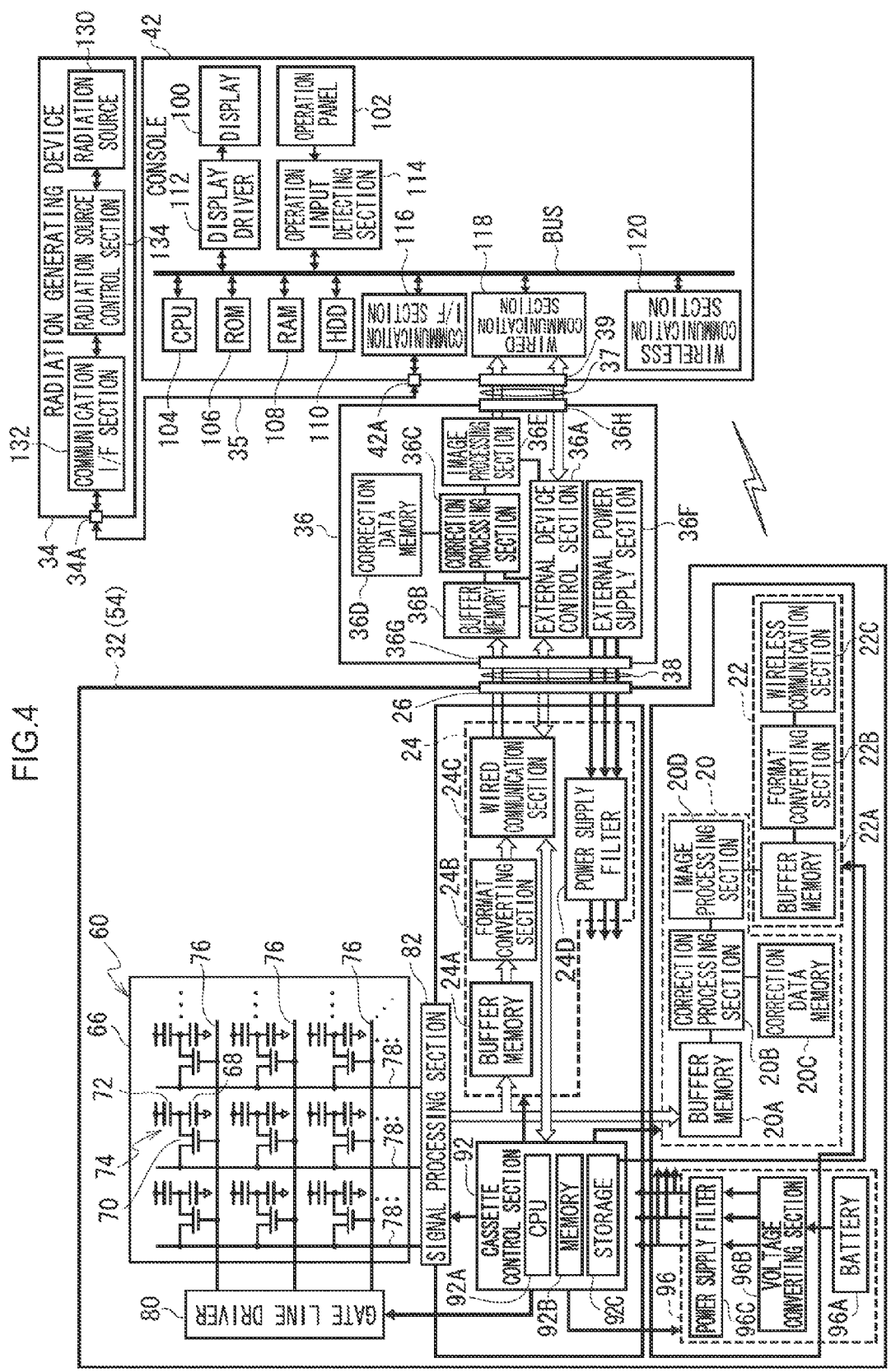
FIG. 4 is a block diagram showing the structure of main portions of an electrical system of the radiation image capturing system relating to the exemplary embodiments.

As shown in FIG. 4, the external device 36 relating to the present exemplary embodiment has an external device control section 36A that controls the overall operations of the external device 36, a buffer memory 36B, a correction processing section 36C, a correction data memory 36D, an image processing section 36E, an external power supply section 36F, a connection terminal 36G, and a connection terminal 36H.

The connection terminal 36G is connected to the connection terminal 26 of the electronic cassette 32 by a communication cable 38. The connection terminal 36H is connected to the console 42 by a communication cable 37.

The input terminal of the external device control section 36A is connected to the connection terminal 36G, and the output terminal thereof is connected to the connection terminal 36H. In a state in which the external device 36 is connected to the electronic cassette 32 by the communication cable 38, the external device control section 36A carries out transmission and reception of various types of information to and from the cassette control section 92 of the electronic cassette 32 via the wired communication section 24C. In a state in which the external device 36 is connected to the console 42 by the communication cable 37, the external device control section 36A can carry out transmission and reception of various types of information to and from the console 42. Due thereto, the external device control section 36A has the function of carrying out the transfer of various types of information between the electronic cassette 32 and the console 42.

The external device control section 36A is also connected to the buffer memory 36B, the correction processing section 36C, the correction data memory 36D, and the image processing section 36E. The external device control section 36A also functions to control the operations of the buffer memory 36B, the correction processing section 36C, the correction data memory 36D, and the image processing section 36E.

The input terminal of the buffer memory 36B is connected to the connection terminal 36G. In a state in which the external device 36 is connected to the electronic cassette 32 by the communication cable 38, digital image data that is outputted from the wired communication section 24C of the electronic cassette 32 is stored in order in the buffer memory 36B. The buffer memory 36B also has the storage capacity to be able to store the digital image data of plural frames. Each time capturing of a radiation image is carried out, the digital image data obtained by the image capturing is successively stored in the buffer memory 36B.

The output terminal of the buffer memory 36B is connected to one input terminal of the correction processing section 36C that has two inputs. The other input terminal of the correction processing section 36C is connected to the output terminal of the correction data memory 36D. By using correction data that is stored in the correction data memory 36D, the correction processing section 36C carries out predetermined image correction processings on the digital image data inputted from the buffer memory 36B. At the external device 36 relating to the present exemplary embodiment, shading correction and defective pixel correction, that are the same as at the correction processing section 20B provided at the electronic cassette 32, are applied as the aforementioned predetermined image correction processings.

The output terminal of the correction processing section 36C, that outputs the digital image data that has been subjected to the image correction processings, is connected to the input terminal of the image processing section 36E. The image processing section 36E carries out predetermined image processings on the digital image data inputted from the correction processing section 36C. At the external device 36 relating to the present exemplary embodiment, gamma correction processing and noise removal processing, that are the same as at the image processing section 20D provided at the electronic cassette 32, are applied as the aforementioned predetermined image processings.

The image processing section 36E is connected to the connection terminal 36H. In the state in which the external device 36 is connected to the console 42 by the communication cable 37, the external device 36 transmits, to the console 42, the digital image data that has been subjected to the image processings by the image processing section 36E.

The external device 36 is used at the time of video image capturing, and the image processing system block 20 provided at the electronic cassette 32 is used at the time of still image capturing. Therefore, structures that operate at high speeds as compared with the correction processing section 20B and the image processing section 20D provided at the image processing system block 20, are used as the correction processing section 36C and the image processing section 36E provided at the external device 36.

The external power supply section 36F provided at the external device 36 generates electric power that is similar to the electric power of the various types of voltages that are generated by the battery 96A and the voltage converting section 96B provided at the electronic cassette 32. The output terminal of the external power supply section 36F is connected to the connection terminal 36G. Accordingly, in the state in which the external device 36 is connected to the electronic cassette 32 via the communication cable 38, the external power supply section 36F supplies generated electric power to the power supply filter 24D.

As described above, the power supply filter 24D is structured similarly to the power supply filter 96C. The output terminal of the power supply filter 24D also is connected to the same electric power supply destinations as the power supply filter 96C. Therefore, in the state in which the external device 36 is connected to the electronic cassette 32 via the communication cable 38, the electric power supplied from the external power supply section 36F is supplied to the respective electric power supply destinations via the power supply filter 24D.

In the image capturing system 18 relating to the present exemplary embodiment, when still image capturing is carried out, the electronic cassette 32 and the external device 36 are not connected. When video image capturing is carried out, the electronic cassette 32 and the external device 36 are connected. Due thereto, the portability of the electronic cassette 32 at the time of capturing still images is ensured, and the amount of heat generated at the time of capturing video images can be suppressed. The external device 36 and the console 42 are always connected via the communication cable 37.

In the image capturing system 18 relating to the present exemplary embodiment, the cassette control section 92 effects control such that, when still image capturing is carried out, electric power is supplied from the power supply section 96 to the respective electric power supply destinations except for the wired communication system block 24 that is incorporated in the electronic cassette 32, and, when video image capturing is carried out, electric power is supplied from the external power supply section 36F to the respective electric power supply destinations except for the image processing system block 20, the wireless communication system block 22 and the power supply section 96 that are incorporated in the electronic cassette 32.

The console 42 is structured as a server computer, and has a display 100 that displays the operation menu, captured radiation images and the like, and an operation panel 102 that is structured to include plural keys and at which various types of information and operating instructions are inputted.

The console 42 relating to the exemplary embodiment includes a CPU 104 that governs the operations of the overall device, a ROM 106 in which various types of programs, including control programs, and the like are stored in advance, a RAM 108 that temporarily stores various types of data, an HDD 110 that stores and holds various types of data, a display driver 112 that controls the display of various types of information on the display 100, and an operation input detecting section 114 that detects the operated state of the operation panel 102.

Further, the console 42 has a communication interface (I/F) section 116, a wired communication section 118, and a wireless communication section 120. The communication interface (I/F) section 116 is connected to a connection terminal 42A and carries out transmission and reception of various types of information, such as exposure conditions that will be described later and the like, with the radiation generating device 34 in a state of being connected to the radiation generating device 34 via a communication cable 35. The wired communication section 118 carries out transmission and reception of various types of information with the external device 36 by wired communication. The wireless communication section 120 carries out transmission and reception of various types of information with the electronic cassette 32 by wireless communication.

The CPU 104, the ROM 106, the RAM 108, the HDD 110, the display driver 112, the operation input detecting section 114, the communication I/F section 116, the wired communication section 118 and the wireless communication section 120 are connected to one another via a system bus BUS. Accordingly, the CPU 104 can access the ROM 106, the RAM 108 and the HDD 110, and can respectively carry out control of display of various types of information on the display 100 via the display driver 112, control of transmission and reception of various types of information with the radiation generating device 34 via the communication I/F section 116, control of transmission and reception of various types of information with the external device 36 via the wired communication section 118, and control of transmission and reception of various types of information with the electronic cassette 32 via the wireless communication section 120. The CPU 104 can grasp the operated state of the operation panel 102 by a user via the operation input detecting section 114.

The radiation generating device 34 has the radiation source 130 that irradiates the radiation X, a communication I/F section 132 that is connected to a connection terminal 34A and that, in a state in which the radiation generating device 34 is connected to the console 42 via the communication cable 35, transmits and receives various types of information such as exposure conditions and the like to and from the console 42, and a radiation source control section 134 that controls the radiation source 130 on the basis of received exposure conditions.

The radiation source control section 134 also is structured by a microcomputer, and stores the received exposure conditions and posture information. The exposure conditions received from the console 42 include information such as the tube voltage, the tube current, the irradiation time period, and the like. The radiation source control section 134 causes the radiation X to be irradiated from the radiation source 130 on the basis of the received exposure conditions.

The console 42 and the radiation generating device 34 are always connected via the communication cable 35.

In the image capturing system 18 relating to the present exemplary embodiment, information relating to patients on which radiation image capturing is to be carried out at the respective radiation image capturing rooms 44 is held as image capturing order information, and radiation image capturing of the respective patients is carried out on the basis of the image capturing order information.

Therefore, the console 42 provided in each radiation image capturing room 44 acquires the aforementioned patient information and the aforementioned image capturing menu that are included in the database 14A from the RIS server 14, and stores them in the HDD 110 as image capturing order information. The console 42 controls the electronic cassette 32 and the radiation generating device 34 on the basis of this image capturing order information.

Image capturing order information relating to the present exemplary embodiment is shown schematically in FIG. 5.

The image capturing order information relating to the present exemplary embodiment is structured in a state in which patient information relating to the patient for whom image capturing is planned such as the name, ID, sex and the like that were mentioned above, and the image capturing menu relating to the radiation image capturing of the corresponding patient, such as the imaged region, number of images to be captured, posture, operation mode and the like that were mentioned above, are combined.

The image capturing order information shown in FIG. 5 stores information expressing, for example, that the ID of patient "Taro Yamada" is "01-001", his sex is "male", the posture of the patient during image capturing in which the number of images to be captured is four is "standing", the operation mode set at the electronic cassette 32 is the still image capturing mode, and the like.

Operation of the image capturing system 18 relating to the present exemplary embodiment is described. Here, in order to avoid complication, description is given of a case in which the above-described image capturing order information is stored in the HDD 110 of the console 42.

The radiologic technologist or the doctor who is to carry out the radiation image capturing (hereinafter called "radiographer") inputs information indicating the subject on whom image capturing is to be carried out from here on (the name of the subject in the present exemplary embodiment) via the operation panel 102 to the console 42 that is provided in the radiation image capturing room 44. If the unillustrated power supply switch of the electronic cassette 32 is in an off state, the radiographer sets it in an on state. If the unillustrated power supply switch of the electronic cassette 32 is in the on state, the radiographer resets the electronic cassette 32 by setting the power supply switch in the off state once and thereafter setting it in the on state. Thereafter, the radiographer inputs, via the operation panel 102, an instruction to execute operation mode transmitting processing.

Figure 6:
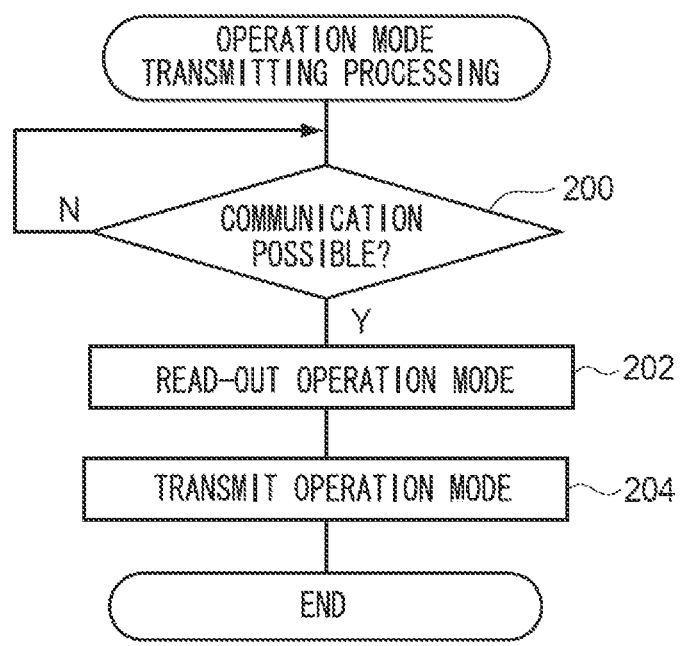
FIG. 6 is a flowchart showing the flow of processings of an operation mode transmitting processing program relating to the exemplary embodiments.

Operation of the console 42 at the time of executing the operation mode transmitting processing is described with reference to FIG. 6. FIG. 6 is a flowchart showing the flow of processings of an operation mode transmitting processing program that is executed by the CPU 104 of the console 42 at this time. This program is stored in advance in a predetermined area of the ROM 106.

In step 200, the electronic cassette 32 provided in the radiation image capturing room 44 stands-by until there becomes a state in which wireless communication by the wireless communication section 22C is possible. In next step 202, information, that expresses the operation mode that corresponds to the information indicating the subject in the image capturing order information (see FIG. 5 as well), is read-out from the HDD 110.

In step 204, the information expressing the operation mode, that was read-out in step 202, is transmitted to the electronic cassette 32 via the wireless communication section 120, and thereafter, the present operation mode transmitting processing program ends.

Figure 7:
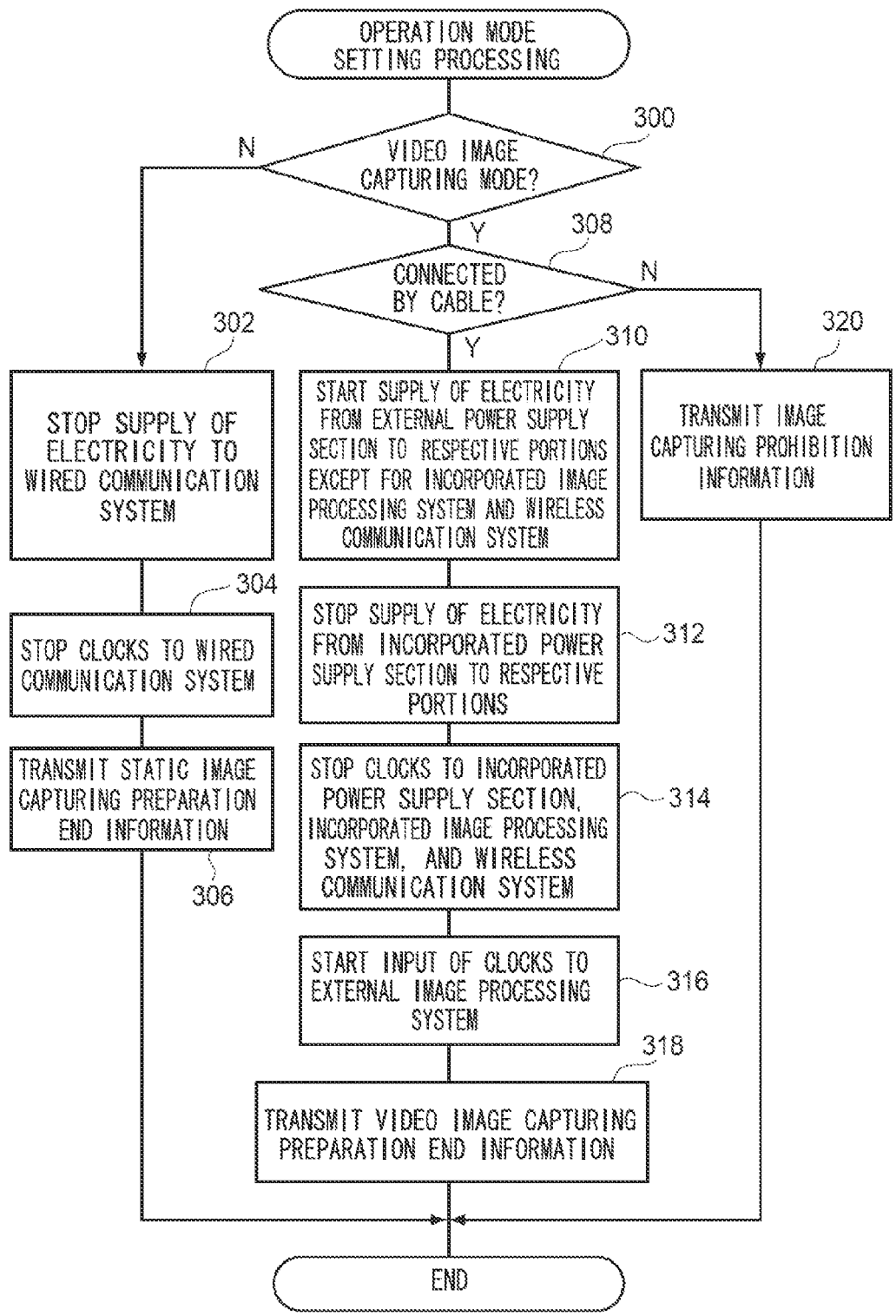
FIG. 7 is a flowchart showing the flow of processings of an operation mode setting processing program relating to a first exemplary embodiment.

Operation of the electronic cassette 32 at the time of receiving this information expressing the operation mode from the console 42, will be described with reference to FIG. 7. FIG. 7 is a flowchart showing the flow of the processings of an operation mode setting processing program that is executed by the CPU 92A of the electronic cassette 32 at this time. This program is stored in advance in a predetermined area of the ROM of the memory 92B. Here, description is given of a case in which, as the defaults (initial settings), supplying of electricity from the power supply section 96 to the respective portions, that are incorporated in the electronic cassette 32 and that are objects of supply of electricity, is carried out, and inputting of clock signals for synchronous control signals to the respective portions, that are incorporated in the electronic cassette 32 and to which the clock signals are inputted, is carried out.

In step 300, it is judged whether or not the operation mode expressed by the received information is the video image capturing mode. If the judgment is negative, it is considered that the operation mode is the static image capturing mode, and the routine moves on to step 302 where control is carried out such that the supply of electricity from the power supply section 96 to the wired communication system block 24 is stopped.

In step 304, control is carried out such that the inputting of clock signals for synchronous control to the wired communication system block 24 is stopped. In step 306, information expressing that preparations for still image capturing are finished (hereinafter called "still image capturing preparation end information") is transmitted to the console 42 via the wireless communication section 22C. Thereafter, the present operation mode setting processing program ends.

If the judgment in step 300 is affirmative, the routine moves on to step 308, and it is judged whether or not the electronic cassette 32 is connected to the external device 36 via the communication cable 38. If this judgment is affirmative, the routine moves on to step 310, and control is carried out to start the supply of the electric power, that is supplied from the external power supply section 36F of the external device 36, to the respective units that are objects of supply of electricity other than the image processing system block 20 and the wireless communication system block 22 (i.e., to the respective sections that are objects of supply of electricity provided at the electronic cassette 32 other than the image processing system block 20 and the wireless communication system block 22, and to the respective units that are objects of supply of electricity provided at the external device 36). In step 312, control is carried out such that the supply of electricity from the power supply section 96 is stopped. In step 314, control is carried out such that the inputting of clock signals for synchronous control to the power supply section 96, the image processing system block 20, and the wireless communication system block 22 is stopped.

In step 316, control is carried out so as to start the inputting of clock signals for synchronous control to the respective units of the image processings system of the external device 36 (in the present exemplary embodiment, the external device control section 36A, the buffer memory 36B, the correction processing section 36C, the correction data memory 36D, and the image processing section 36E). In step 318, information expressing that preparations for video image capturing are finished (hereinafter called "video image capturing preparation end information") is transmitted to the console 42 via the wired communication section 24C and the external device control section 36A. Thereafter, the present operation mode setting processing program ends.

If the judgment in step 308 is negative, the routine moves on to step 320, and information expressing that image capturing by the electronic cassette 32 is prohibited (hereinafter called "image capturing prohibition information") is transmitted to the console 42 via the wireless communication section 22C. Thereafter, the present operation mode setting processing program ends.

The information that is transmitted from the electronic cassette 32 due to the execution of the present operation mode setting processing program (in the present exemplary embodiment, any of the still image capturing preparation end information, the video image capturing preparation end information, and the image capturing prohibition information) is stored in a predetermined area of the HDD 110 at the console 42.

The radiographer operates the console 42 and makes the display 100 display the image capturing menu relating to the subject that is included in the image capturing order information. In accordance with the imaged region of the subject and the image capturing conditions that are grasped from the image capturing menu, the radiographer carries out, via the operation panel 102 of the console 42, an exposure condition designating operation that designates the tube voltage, the tube current and the irradiation time at the time of irradiating the radiation X.

When the exposure condition designating operation is carried out, the console 42 executes radiation image capturing processing.

Figure 8:
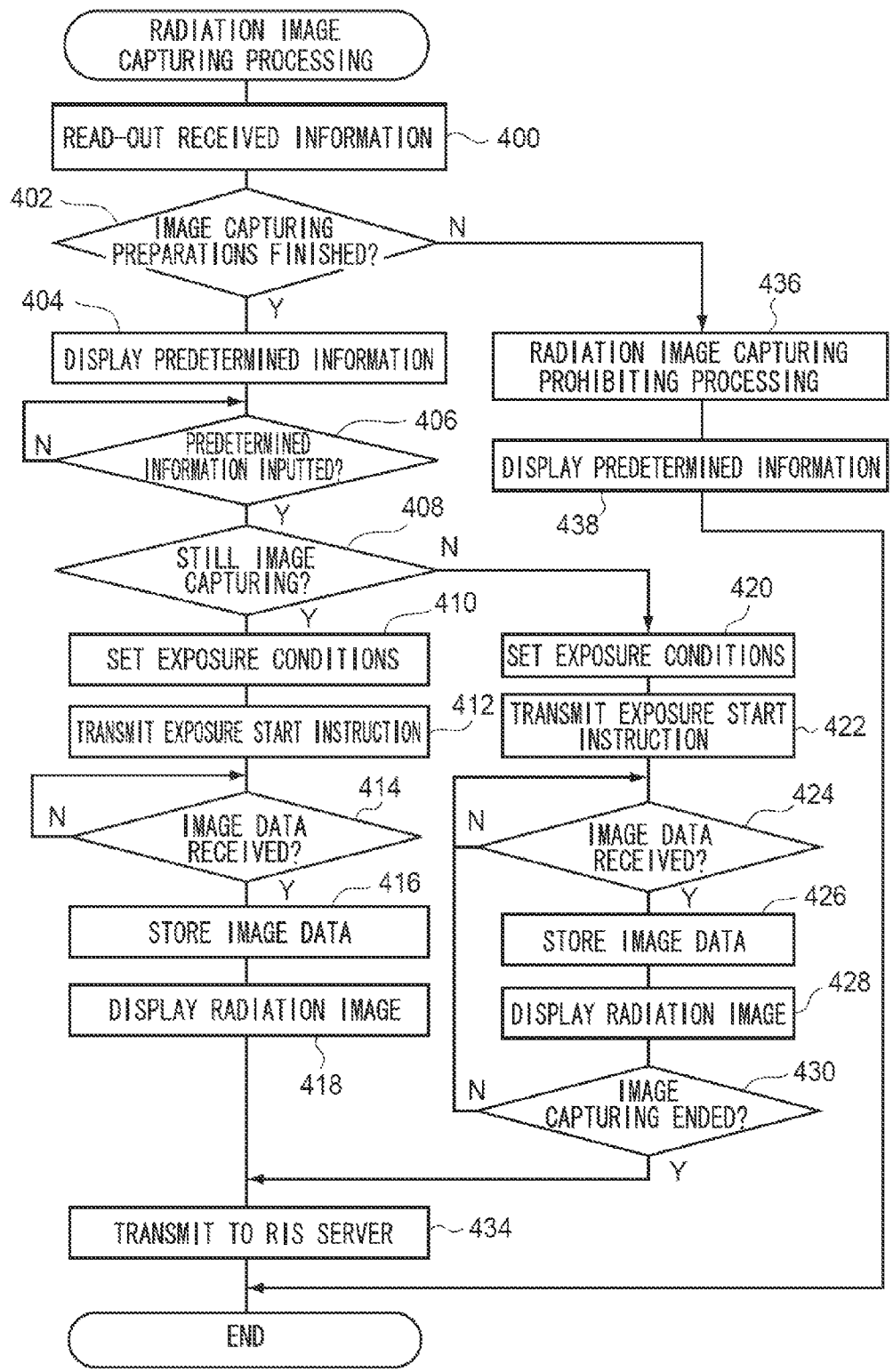
FIG. 8 is a flowchart showing the flow of processings of a radiation image capturing processing program relating to the first exemplary embodiment.

The operation at the console 42 at the time of execution of the radiation image capturing processing is described with reference to FIG. 8. FIG. 8 is a flowchart showing the flow of processings of a radiation image capturing processing program that is executed by the CPU 104 of the console 42 at this time. This program is stored in advance in a predetermined area of the ROM 106.

In step 400, the any of the still image capturing preparation end information, the video image capturing preparation end information and the image capturing prohibition information, that was received from the electronic cassette 32 and stored, is read-out from the HDD 110. In step 402, it is judged whether or not the read-out information is either of the still image capturing preparation end information or the video image capturing preparation end information. If the judgment is affirmative, the routine moves on to step 404.

In step 404, the display driver 112 is controlled such that the display 100 is made to display predetermined information expressing that image capturing is permitted. In step 406, the routine awaits input of predetermined information.

Figure 9:
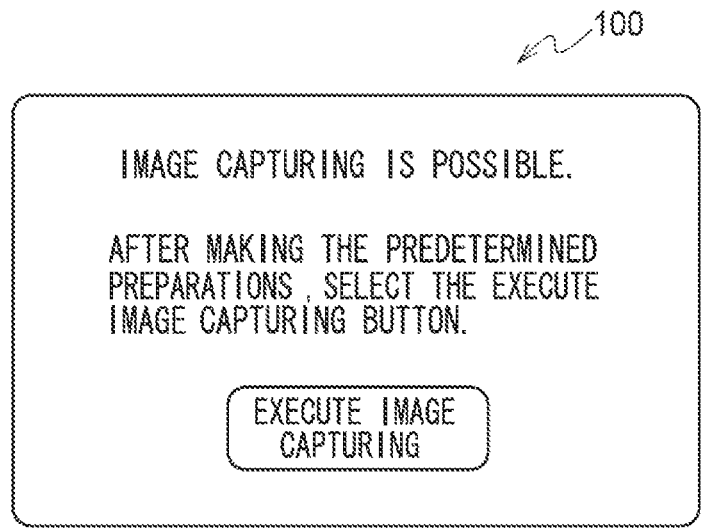
FIG. 9 is a schematic drawing showing an example of information displayed by execution of radiation image capturing processing programs relating to the exemplary embodiments.

An example of information that is displayed by the display 100 due to the processing of step 404 is shown in FIG. 9. In this example, the message that "Image capturing is possible. After making the predetermined preparations, select the execute image capturing button." is displayed together with an execute image capturing button.

When information such as that shown in FIG. 9 is displayed by the display 100, the radiographer has the subject either lay down at the image capturing position 50 in the space above the bed 46 or stand at the image capturing position 48 in the space in front of the rack 45, in accordance with the posture (laying down or standing) of the subject at the time of image capturing that is grasped from the operation menu that was displayed on the display 100.

In accordance with the grasped region that is the object of image capturing, the radiographer either places the electronic cassette 32 between the bed surface of the bed 46 and that region that is the object of image capturing, or at the height-wise position of the rack 45 corresponding to that region that is the object of image capturing.

The radiographer operates the supporting/moving mechanism 52 such that the radiation generating device 34 is placed in front of the region that is the object of image capturing, and thereafter, selects the execute image capturing button displayed on the display 100. In accordance therewith, the judgment in step 406 becomes affirmative, and the routine moves on to step 408.

In step 408, by judging whether or not the information that was read-out by the processing of step 400 is the still image capturing preparation end information, it is judged whether or not still image capturing is to be carried out. If the judgment is affirmative, the routine moves on to step 410, and, by transmitting the designated exposure conditions to the radiation generating device 34 and the electronic cassette 32, those exposure conditions are set. In accordance therewith, the radiation source control section 134 carries out preparations for exposure at the received exposure conditions.

In step 412, instruction information that instructs starting of exposure is transmitted to the radiation generating device 34 and the electronic cassette 32.

The radiation source 130 generates and emits radiation at the tube voltage and the tube current and for the irradiation time period that correspond to the exposure conditions received from the console 42.

The radiation X irradiated from the radiation source 130 passes through the subject, and thereafter, reaches the electronic cassette 32. Due thereto, charges are accumulated in the storage capacitors 68 of the respective pixel portions 74 of the radiation detector 60 incorporated in the electronic cassette 32.

After the irradiation time period, that was designated by the exposure conditions, elapses from the receipt of the instruction information that instructs the start of exposure, the cassette control section 92 of the electronic cassette 32 controls the gate line driver 80 such that on signals are outputted from the gate line driver 80 to the respective gate lines 76 in order and line-by-line, and the respective TFTs 70 that are connected to the respective gate lines 76 are turned on in order and line-by-line.

When the respective TFTs 70 that are connected to the respective gate lines 76 are turned on in order and line-by-line, the radiation detector 60 causes the charges that are accumulated in the respective storage capacitors 68 to flow-out in order and line-by-line to the respective data lines 78 as electric signals. The electric signals, that have flowed-out to the respective data lines 78, are converted into digital image data at the signal processing section 82, and are stored in the buffer memory 20A.

After image capturing is finished, the cassette control section 92 carries out, on the digital image data that is stored in the buffer memory 20A, image correction processings by the correction processing section 20B of the image processing system block 20 and carries out image processings by the image processing section 20D. Thereafter, the cassette control section 92 transmits the digital image data to the console 42 by wireless communication via the wireless communication system block 22.

In step 414, the routine stands-by until the digital image data is received from the electronic cassette 32. In step 416, the digital image data that is received (hereinafter called "received image data") is stored in the HDD 110. In step 418, the display driver 112 is controlled such that the radiation image expressed by the received image data is displayed by the display 100 for confirmation and the like, and thereafter, the routine moves on to step 434 that will be described later.

If the judgment in step 408 is negative, it is considered that video image capturing is to be carried out. The routine moves on to step 420, and, by transmitting the designated exposure conditions to the radiation generating device 34 and the electronic cassette 32, those exposure conditions are set. In accordance therewith, the radiation source control section 134 carries out preparations for exposure at the received exposure conditions.

In step 422, instruction information that instructs starting of exposure is transmitted to the radiation source generating device 34 and the electronic cassette 32.

The radiation source 130 generates and emits radiation at the tube voltage and the tube current and for the irradiation time period that correspond to the exposure conditions received from the console 42.

The radiation X irradiated from the radiation source 130 passes through the subject, and thereafter, reaches the electronic cassette 32. Due thereto, charges are accumulated in the storage capacitors 68 of the respective pixel portions 74 of the radiation detector 60 incorporated in the electronic cassette 32.

Thereafter, image capturing operations, that are substantially similar to those at the time of still image capturing, are carried out at the electronic cassette 32. The capturing of video images differs with regard to the point that the image capturing operations are executed at a speed that is determined in advance as the video image capturing speed (30 frames/sec in the present exemplary embodiment), and the point that image capturing is carried out successively for the irradiating time period corresponding to the received exposure conditions, and the point that the digital image data obtained by the image capturing is transmitted to the console 42 via the wired communication system block 24 and the external device 36.

In step 424, the routine stands by until the digital image data of one frame is received from the electronic cassette 32. In step 426, the received digital image data (received image data) is stored in the HDD 110. In step 428, the display driver 112 is controlled such that the radiation image expressed by the received image data is displayed by the display 100 for confirmation and the like. In step 430, it is judged whether or not video image capturing is finished. If the judgment is negative, the routine returns to step 424. At the point in time when the judgment becomes affirmative, the routine moves on to step 434. In the radiation image capturing processing program relating to the present exemplary embodiment, the judgment in above step 430 as to whether or not video image capturing is finished is carried out by judging whether or not digital image data has not been received in greater than or equal to a predetermined time period (one second in the present exemplary embodiment) from the end of receipt of digital image data from the electronic cassette 32. However, the present invention is not limited to the same, and another form may be used, such as the judgment as to whether or not video image capturing is finished is carried out by judging whether or not information expressing that video image capturing is finished has been inputted by the radiographer via an input unit such as the operation panel 102 or the like, or the like.

In step 434, the received image data is transmitted to the RIS server 14 via the in-hospital network 16, and thereafter, the present radiation image capturing processing program ends. The received image data that is transmitted to the RIS server 14 is stored in the database 14A, such that a doctor can carry out interpretation of the captured radiation images, diagnosis, and the like.

If the judgment in step 402 is negative, it is considered that the information read-out by the processing of step 400 is image capturing prohibition information. The routine moves on to step 436 where a predetermined processing (hereinafter called "radiation image capturing prohibiting processing") is executed as a means for prohibiting the capturing of radiation images. In the radiation image capturing processing program relating to the present exemplary embodiment, the processing of transmitting to the radiation source generating device 34 instruction information that forcibly cuts-off the supply path of the electric power for driving to the radiation source 130 is used as the radiation image capturing prohibiting processing that is executed in present step 436. However, the present invention is not limited to the same. Another processing that can prohibit the capturing of radiation images, such as, for example, processing that transmits to the electronic cassette 32 instruction information to stop operation of the respective portions, or the like can be used.

In step 438, the display driver 112 is controlled such that predetermined information expressing that image capturing has been discontinued is displayed by the display 100. Thereafter, the present radiation image capturing processing program ends.

Figure 10:
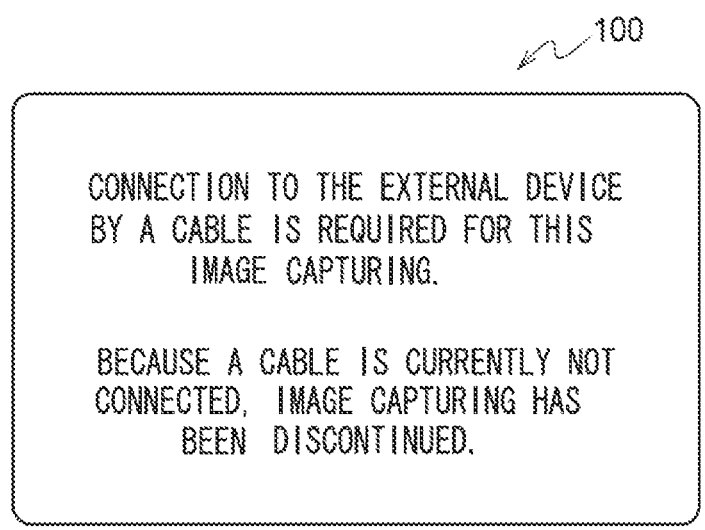
FIG. 10 is a schematic drawing showing an example of information displayed by execution of radiation image capturing processing programs relating to the exemplary embodiments.

FIG. 10 shows an example of information that is displayed by the display 100 due to the processing of step 438. In this example, the information that "Connection to the external device by a cable is required for this image capturing. Because a cable is currently not connected, image capturing has been discontinued." is displayed. Accordingly, by referring to this information, the radiographer can easily grasp that this is image capturing requiring the electronic cassette 32 to be connected to the external device 36, and that image capturing has been discontinued.

Second Exemplary Embodiment

Hereinafter, a second exemplary embodiment of the present invention will be described. Because the structures of the RIS 10 and the image capturing system 18 relating to the present second exemplary embodiment are similar to those of the above-described first exemplary embodiment, description thereof is omitted here.

Operation of the image capturing system 18 relating to the present second exemplary embodiment is described hereinafter.

In the image capturing system 18 relating to the present second exemplary embodiment as well, at the console 42, the operation mode transmitting processing program (see FIG. 6) relating to the above-described first exemplary embodiment is executed, and information expressing the operation mode is transmitted to the electronic cassette 32.

Figure 11:
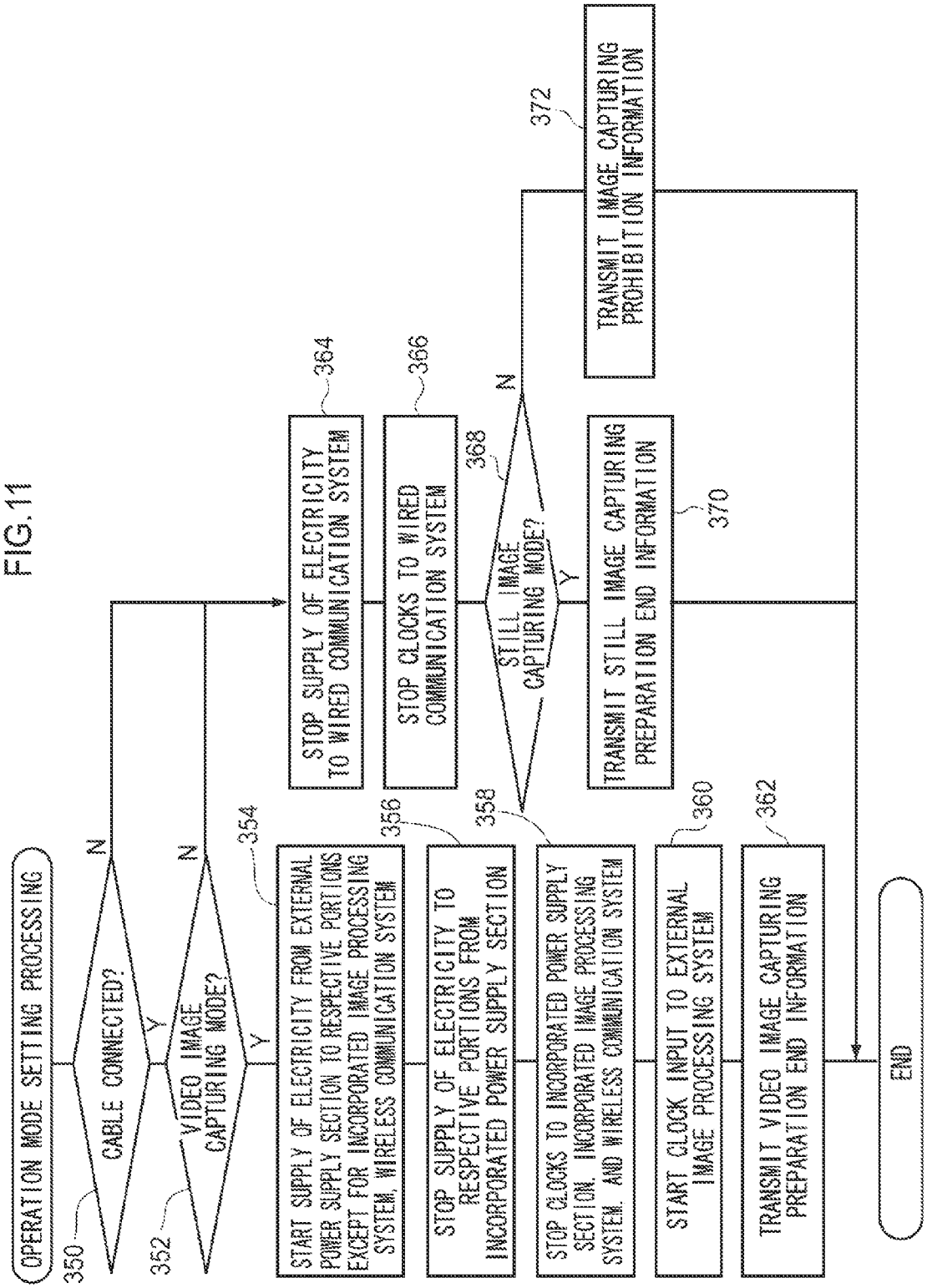
FIG. 11 is a flowchart showing the flow of processings of an operation mode setting processing program relating to a second exemplary embodiment.

Operation of the electronic cassette 32 at the time of receiving the information expressing the operation mode from the console 42 will be described with reference to FIG. 11. FIG. 11 is a flowchart showing the flow of processings of an operation mode setting processing program that is executed by the CPU 92A of the electronic cassette 32 relating to the present second exemplary embodiment at this time. This program is stored in advance in a predetermined area of the ROM of the memory 92B. Here, description is given of a case in which, as the defaults (initial settings), supplying of electricity from the power supply section 96 to the respective portions, that are incorporated in the electronic cassette 32 and that are objects of supply of electricity, is carried out, and inputting of clock signals for synchronous control to the respective portions, that are incorporated in the electronic cassette 32 and to which the clock signals are inputted, is carried out.

In step 350, it is judged whether or not the electronic cassette 32 is connected to the external device 36 via the communication cable 38. If the judgment is affirmative, the routine moves on to step 352, and it is judged whether or not the operation mode expressed by the received information is the video image capturing mode. If the judgment is affirmative, the routine moves on to step 354.

In step 354, control is carried out so as to start the supply of electric power, that is supplied from the external power supply section 36F of the external device 36, to the respective sections that are objects of supply of electricity other than the image processing system block 20 and the wireless communication system block 22 (i.e., to the respective sections that are objects of supply of electricity provided at the electronic cassette 32 other than the image processing system block 20 and the wireless communication system block 22, and to the respective sections that are objects of supply of electricity provided at the external device 36). In step 356, control is carried out so as to stop the supply of electricity from the power supply section 96. In step 358, control is carried out so as to stop the inputting of clock signals for synchronous control to the power supply section 96, the image processing system block 20, and the wireless communication system block 22.

In step 360, control is carried out so as to start the inputting of clock signals for synchronous control to the respective sections of the image processing system of the external device 36 (in the present exemplary embodiment, the external device control section 36A, the buffer memory 36B, the correction processing section 36C, the correction data memory 36D, and the image processing section 36E). In step 362, information expressing that preparations for video image capturing are finished (video image capturing preparation end information) is transmitted to the console 42 via the wired communication section 24C and the external device control section 36A. Thereafter, the present operation mode setting processing program ends.

If the judgment in step 350 or step 352 is negative, either the electronic cassette 32 is not connected to the external device 36 or it is considered that the operation mode expressed by the received information is the still image capturing mode. The routine moves on to step 364, and control is carried out to stop the supply of electricity from the power supply section 96 to the wired communication system block 24.

In step 366, control is carried out so as to stop the inputting of clock signals for synchronous control to the wired communication system block 24. In step 368, it is judged whether or not the operation mode expressed by the received information is the still image capturing mode. If the judgment is affirmative, the routine moves on to step 370, and information expressing that preparations for still image capturing are finished (still image capturing preparation end information) is transmitted to the console 42 via the wireless communication section 22C. Thereafter, the present operation mode setting processing program ends.

If the judgment in step 368 is negative, the routine moves on to step 372, and information expressing that image capturing by the electronic cassette 32 is prohibited (image capturing prohibition information) is transmitted to the console 42 via the wireless communication section 22C. Thereafter, the present operation mode setting processing program ends.

The radiographer operates the console 42 and makes the display 100 display the image capturing menu relating to the subject that is included in the image capturing order information. In accordance with the imaged region of the subject and the image capturing conditions that are grasped from that image capturing menu, the radiographer carries out, via the operation panel 102 of the console 42, an exposure condition designating operation that designates the tube voltage, the tube current and the irradiation time at the time of irradiating the radiation X.

When the exposure condition designating operation is carried out, the console 42 executes radiation image capturing processing.

Figure 12:
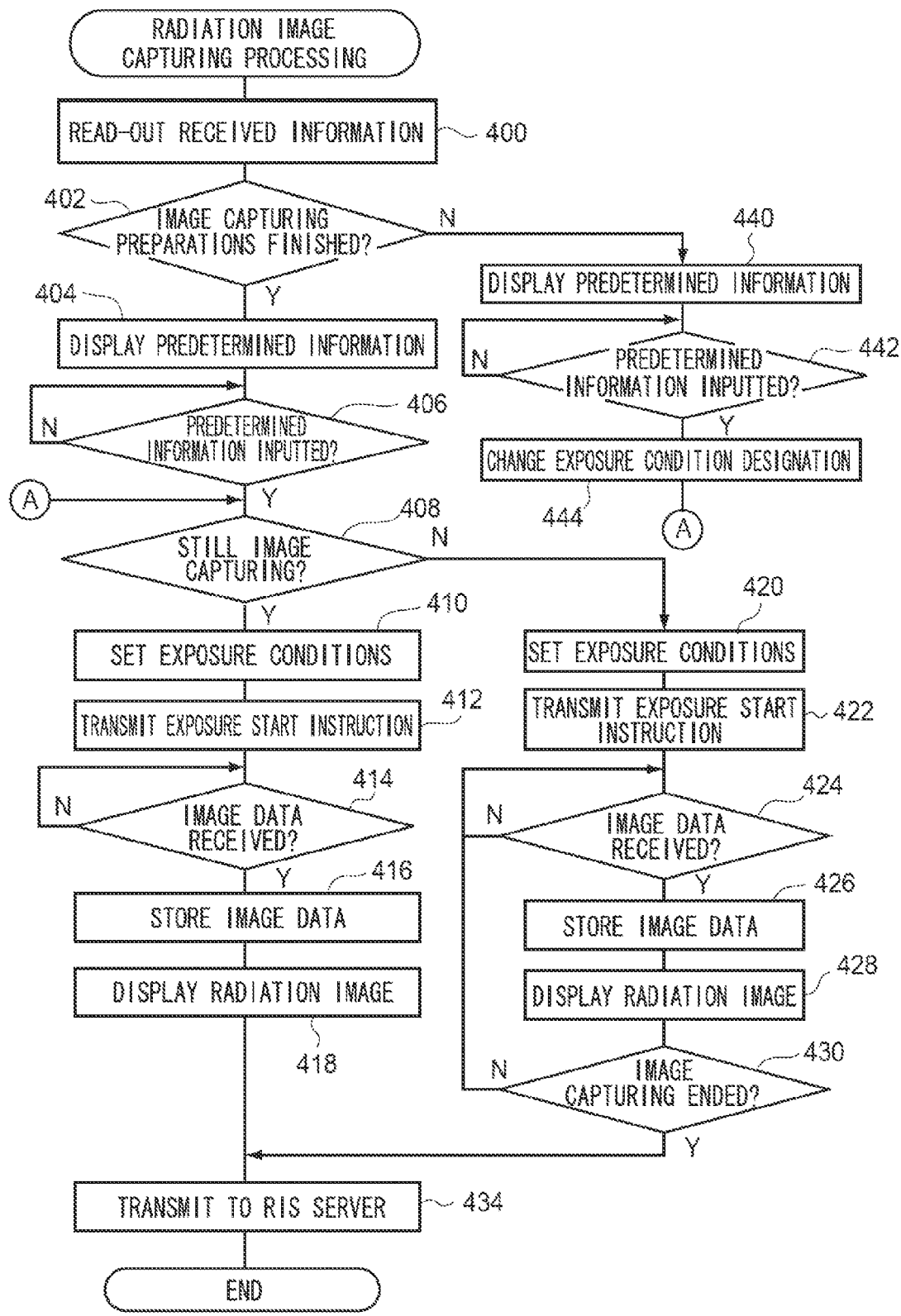
FIG. 12 is a flowchart showing the flow of processings of a radiation image capturing processing program relating to the second exemplary embodiment.

Operation of the console 42 relating to the present second exemplary embodiment at the time of executing the radiation image capturing processing is described with reference to FIG. 12. FIG. 12 is a flowchart showing the flow of processings of the radiation image capturing processing program that is executed by the CPU 104 of the console 42 at this time. Steps that carry out processings that are the same as those of the radiation image capturing processing program relating to the above-described first exemplary embodiment (see FIG. 8) are denoted by the same step numbers, and description thereof is omitted.

If the judgment in step 402 is negative, the routine moves on to step 440, and the display driver 112 is controlled so as to cause the display 100 to display information expressing that the operation mode is limited because the electronic cassette 32 is not connected to the external device 36 via the communication cable 38. In step 442, the routine awaits input of predetermined information.

FIG. 13 shows an example of the information that is displayed by the display 100 due to the processing of above step 440. In this example, the message "Connection to the external device by a cable is required for this image capturing. Because a cable is not connected, the operation mode is limited to the still image capturing mode. After making the predetermined preparations, select the execute image capturing button." is displayed together with an execute image capturing button.

When information such as that shown in FIG. 13 is displayed by the display 100, the radiographer has the subject either lay down at the image capturing position 50 in the space above the bed 46 or stand at the image capturing position 48 in the space in front of the rack 45, in accordance with the posture (laying down or standing) of the subject at the time of image capturing that is grasped from the operation menu that was displayed on the display 100.

In accordance with the grasped region that is the object of image capturing, the radiographer either places the electronic cassette 32 between the bed surface of the bed 46 and that region that is the object of image capturing, or at the heightwise position of the rack 45 corresponding to that region that is the object of image capturing.

The radiographer operates the supporting/moving mechanism 52 such that the radiation generating device 34 is placed in front of the region that is the object of image capturing, and thereafter, selects the execute image capturing button displayed on the display 100. In accordance therewith, the judgment in step 442 becomes affirmative, and the routine moves on to step 444. Processing for changing the exposure conditions, that were designated by the radiographer before start of execution of the present image capturing processing program, to conditions at the time of carrying out still image capturing, are executed, and thereafter, the routine moves on to step 410.

Although the present invention has been described above by using exemplary embodiments, the technical scope of the present invention is not limited to the scope described in the above exemplary embodiments. Various changes or improvements can be added to the above exemplary embodiments within a range that does not deviate from the gist of the invention. Forms to which such changes or improvements have been added also are included in the technical scope of the present invention.

The above-described exemplary embodiments do not limit the inventions relating to the claims, nor is it the case that all of the combinations of features described in the exemplary embodiments are essential to the means of the present invention for solving the problems of the conventional art. Inventions of various stages are included in the above exemplary embodiments, and various inventions can be extracted from appropriate combinations of plural constituent features that are disclosed. Even if some of the constituent features are omitted from all of the constituent features that are shown in the exemplary embodiments, such structures from which some constituent features are omitted can be extracted as inventions provided that the effects of the present invention are obtained.

Figure 14:
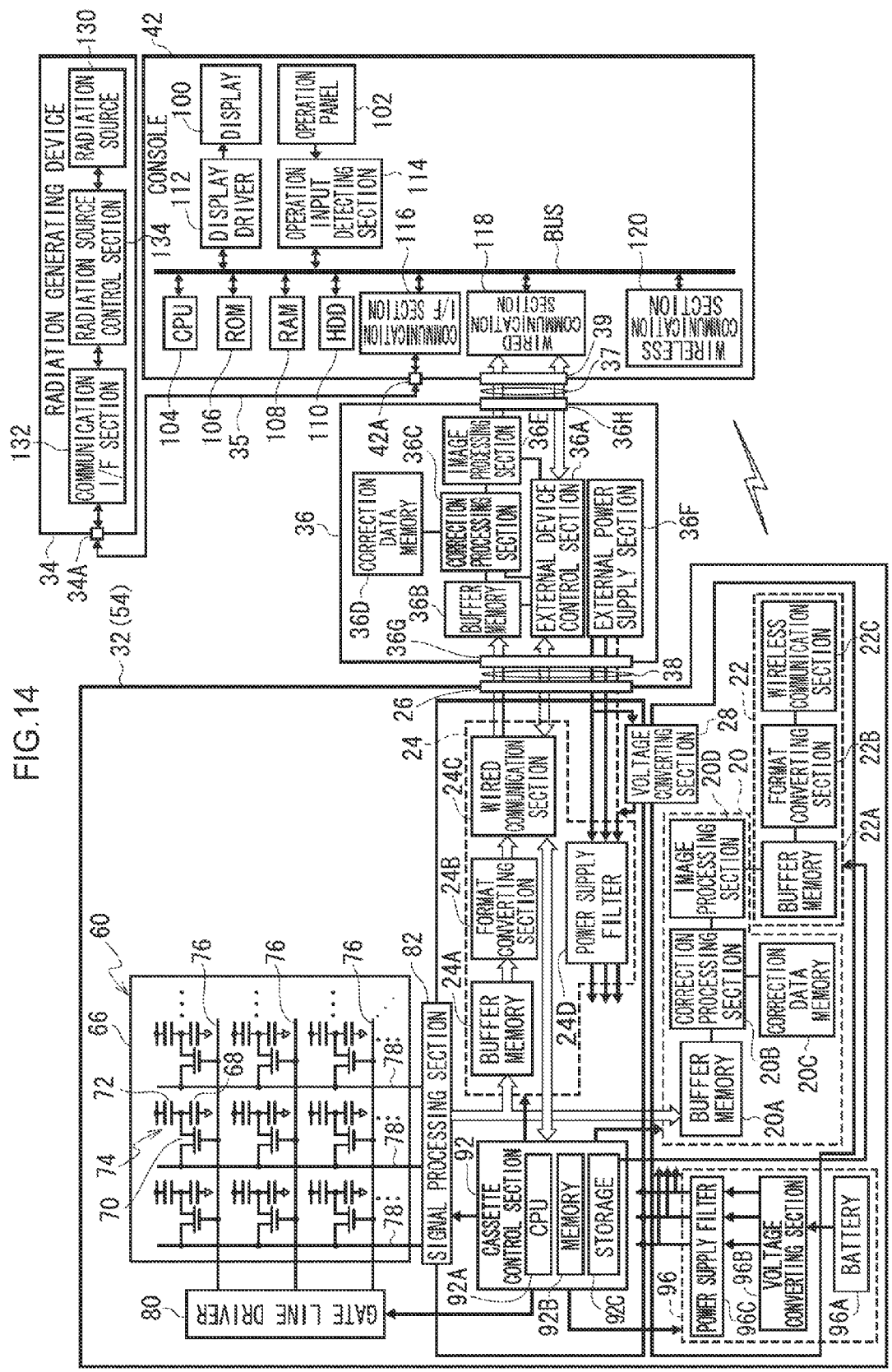
FIG. 14 is a block diagram showing the structure of main portions of the electrical system of a modified example of the radiation image capturing system relating to the exemplary embodiments.

For example, the above respective exemplary embodiments describe a case in which the electronic cassette 32 and the external power supply section 36F of the external device 36 are connected by a number of connection wires that is the same as the number of output terminals of the voltage converting section 96B of the power supply section 96 at the electronic cassette 32. However, the present invention is not limited to the same. For example, as shown in FIG. 14, a voltage converting section 28 may be newly provided at the electronic cassette 32, and electric power of some of the voltages that are needed may be generated by this voltage converting section 28 from the electric power supplied via the communication cable 38. In this case, the number of connection wires between the electronic cassette 32 and the external power supply section 36F can be reduced as compared with the above-described exemplary embodiments.

The above exemplary embodiments describe a case in which one type of each of the still image capturing mode and the video image capturing mode are used as the operation modes that are installed in advance in the electronic cassette 32, but the present invention is not limited to the same. For example, operation switching information corresponding to plural types of still image capturing modes and video image capturing modes such as shown in FIG. 15 for example, may be stored in advance in a storage unit such as the storage 92C or the like, and control corresponding to the selected operation mode may be carried out by using this operation switching information.

In FIG. 15, "O" (used) expresses regions that are used in the selected operation mode, and "X" (not used) expresses regions that are not used in the selected operation mode. "Power supply system" in FIG. 15 corresponds to the power supply section 96, "image processing system" corresponds to the image processing system block 20, "wireless communication system" corresponds to the wireless communication system block 22, "wired communication system" corresponds to the wired communication system block 24, and "external power supply converting system" corresponds to the voltage converting section 28 in the structure illustrated in FIG. 14. "Urgent" in FIG. 15 expresses an operation mode in a case in which electric power is supplied from the external power supply section 36F urgently in a case in which, accompanying a decrease in the remaining capacity of the battery 96A, the supply of electric power to the respective portions of the electronic cassette 32 can no longer be carried out by the electric power supplied from the battery 96A.

Type A of the still image capturing mode in FIG. 15 corresponds to the still image capturing mode relating to the above-described respective exemplary embodiments. Type A of the video image capturing mode corresponds to the video image capturing mode relating to the above-described respective exemplary embodiments. In type B of the still image capturing mode, it is shown that the buffer memory 24A and the format converting section 24B at the wired communication system block 24 are used, but they are used so as to also serve as the buffer memory 22A of the wireless communication system block 22. In type C through type F of the video image capturing mode, it is shown that the buffer memory 22A and the format converting section 22B at the wireless communication system block 22 are used, but they are used so as to also serve as the buffer memory 24A of the wired communication system block 24. In both type D and type E of the video image capturing mode, it is shown that the voltage converting section 96B is partially used, but in type D, the voltage converting section 96B is used except for voltages whose voltage conversion range and consumed electric power are relatively large, and, in type E, the voltage converting section 96B is used only for voltages that are sensitive to noise.

In these cases as well, effects that are similar to those of the above-described respective exemplary embodiments can be achieved.

The above exemplary embodiments describe a case in which, when information expressing the video image capturing mode is received at the electronic cassette 32 from the console 42, switching is carried out so as to use the external device 36. However, the present invention is not limited to the same. For example, switching may be carried out so as to use the external device 36 in a case in which the electronic cassette 32 is connected via the communication cable 38 to the external device 36.

For example, a form may be used in which, when the electronic cassette 32 is connected to the external device 36 via the communication cable 38, the processings of step 310 through step 318 in the operation mode setting processing program shown in FIG. 7 are executed, and, in a case in which the electronic cassette 32 transitions from a state of being connected to the external device 36 to a state of being disconnected therefrom, the processings of step 302 through step 306 are executed. In this case, the amount of generated heat can be suppressed more easily.

Description is given in the above exemplary embodiments of a case in which, when the external device 36 is connected to the electronic cassette 32, control is carried out so as to stop the clock signals for synchronous control and the electric power for driving that are supplied to the image processing system block 20 and the wireless communication system block 22. However, the present invention is not limited to the same. Control may be carried out such that, among the aforementioned clock signals for synchronous control and electric power for driving, only one thereof is stopped. Or, control may be carried out such that at least one of the frequency of the aforementioned clock signals for synchronous control and electric power for driving is reduced.

In this case, a power saving mode may be provided at the electronic cassette 32. If the power saving mode is a mode that decreases the electric power consumed by at least one of the image processing system block 20 and the wireless communication system block 22, this power saving mode may be entered into when the external device 36 is connected to the electronic cassette 32.

In this case, the amount of heat that is generated can be decreased by using the power saving mode that is provided in advance, and therefore, the present invention can be realized even more easily.

Although the above respective exemplary embodiments describe a case in which the video image capturing mode is used as the operation mode that generates the predetermined generated heat amount or more of the present invention, the present invention is not limited to the same. For example, an operation mode, in which the transfer speed of the image data at the electronic cassette 32 is greater than or equal to a speed that is determined in advance as a speed at which heat is generated such that the generated heat amount is the predetermined generated heat amount or more, may be used. Or, an operation mode, in which the number of pixels of the image captured by the radiation detector 60 is greater than or equal to a number of pixels that is determined in advance as a number of pixels at which heat is generated such that the generated heat amount is the predetermined generated heat amount or more, or the like, may be used. In these cases as well, effects that are similar to those of the above-described exemplary embodiments can be achieved.

Although a case in which the external device 36 is a single unit structure is described in the above exemplary embodiments, the present invention is not limited to the same. The external device 36 may be incorporated into another device such as the console 42 or the like. In this case as well, effects that are similar to those of the above-described exemplary embodiments can be obtained.

The above exemplary embodiments describe cases in which the function of carrying out image processing and the function of supplying the electric power of a power source are both provided at the external device 36, and, when the external device 36 is connected to the electronic cassette 32, both of these functions are used. However, the present invention is not limited to the same, and either one of these functions may be provided at the external device 36, and that function only may be used when the external device 36 is connected to the electronic cassette 32.

The above first exemplary embodiment describes a case in which, regardless of whether video image capturing is to be carried out, if the external device 36 is not connected to the electronic cassette 32, both radiation image capturing prohibiting processing and the issuing of a warning are carried out by the processings of step 436 and step 438 of the radiation image capturing processing program. However, the present invention is not limited to the same, and either one only among the radiation image capturing prohibiting processing and the issuing of a warning may be carried out. In this case as well, effects that are substantially similar to those of the above-described first exemplary embodiment can be achieved.

The above second exemplary embodiment describes a case in which two types of operation modes that are the still image capturing mode and the video image capturing mode are used as the operation modes that are provided in advance in the electronic cassette 32, and, in a case in which the electronic cassette 32 is connected to the external device 36, either of the operation modes can be selected, and, in a case in which the electronic cassette 32 is not connected to the external device 36, only the still image capturing mode can be selected. However, the present invention is not limited to the same. Three or more types of operation modes may be provided in advance in the electronic cassette 32, and, in a case in which the electronic cassette 32 is connected to the external device 36, more operation modes may be made able to be selected than in a case in which the electronic cassette 32 is not connected to the external device 36. In this case as well, effects that are similar to those of the above-described second exemplary embodiment can be achieved.

Moreover, the structure of the RIS 10 (see FIG. 1), the structure of the radiation image capturing room (see FIG. 2), the structure of the electronic cassette 32 (see FIG. 3), and the structure of the image capturing system 18 (see FIG. 4 and FIG. 14) that are described in the above exemplary embodiments are examples. Unnecessary portions may be eliminated therefrom, new portions may be added thereto, or the states of connection may be changed, within a scope that does not deviate from the gist of the present invention.

The structure of the image capturing order information (see FIG. 5) explained in the above exemplary embodiments is an example, and unnecessary information may be eliminated therefrom, new information may be added thereto, or the information may be changed, within a scope that does not deviate from the gist of the present invention.

The flows of the processings of the various types of processing programs that were explained in the above exemplary embodiments (see FIG. 6 through FIG. 8, and FIG. 11 through FIG. 12) also are examples. Unnecessary steps may be eliminated therefrom, new steps may be added thereto, or order of the processings may be rearranged, within a scope that does not deviate from the gist of the present invention.

The displayed information described in the above exemplary embodiments (see FIG. 9 through FIG. 10, and FIG. 13) as well are examples, and the displayed contents may be changed within a scope that does not deviate from the gist of the present invention.

In accordance with a first aspect of the present invention, there is provided a radiation image capturing device including: a radiation image capturing section that is adapted to capture, in an operation mode selected from among a plurality of operation modes that are determined in advance, of a radiation image expressed by radiation that has passed through a subject of image capturing; an image processing section that carries out predetermined image processing on image information obtained by image capturing by the radiation image capturing section; a power supply section that supplies electric power for driving to the radiation image capturing section; a connection portion that electrically connects to at least one of a power supply device, that is adapted to supply electric power for driving to the radiation image capturing section, and an image processing device, that carries out same sort of image processing as the image processing section; and a control section that effects control such that, in a case in which an operation mode that generates a predetermined generated heat amount or more has been selected as the operation mode and the power supply device is connected to the connection portion, the power supply device is used instead of the power supply section, and, in a case in which an operation mode that generates a predetermined generated heat amount or more has been selected as the operation mode and the image processing device is connected to the connection portion, the image processing device is used instead of the image processing section.

In the radiation image capturing device of the first aspect of the present invention, control is carried out such that, in a case in whish an operation mode that generates a predetermined generated heat amount or more is selected as the operation mode and a power supply device that is provided at the exterior is connected to the connection portion, the power supply device is used instead of the incorporated power supply section, and, in a case in which an operation mode that generates a predetermined generated heat amount or more is selected as the operation mode and an image processing device that is provided at the exterior is connected to the connection portion, the image processing device is used instead of the incorporated image processing section. Due thereto, the amount of generated heat can be suppressed without leading to the device becoming larger. On the other hand, an increase in costs and increased complexity of the device can be suppressed as compared with a technique in which a detachable cooling unit is readied at the radiation image capturing device.

In accordance with a second aspect of the present invention, in the above-described first aspect, the operation mode that generates a predetermined generated heat amount or more may be at least one of an operation mode in which an image capturing speed by the radiation image capturing section is greater than or equal to a predetermined image capturing speed, and an operation mode in which a transfer speed of the image information is greater than or equal to a predetermined transfer speed. Due thereto, the amount of heat generated at the time of image capturing in the operation mode that is applied can be suppressed.

In accordance with a third aspect of the present invention, in the above-described first aspect of second aspect, the device may further include a detecting section that detects that at least one of the power supply device and the image processing device is connected to the connection portion, and the control section may effect control such that, in a case in which the detecting section detects that the power supply device is connected to the connection portion, the power supply device is used instead of the power supply section, and, in a case in which the detecting section detects that the image processing device is connected to the connection portion, the image processing device is used instead of the image processing section. Due thereto, the amount of generated heat can be suppressed more easily.

In accordance with a fourth aspect of the present invention, there is provided a radiation image capturing device including: a radiation image capturing section that is adapted to capture, in an operation mode selected from among a plurality of operation modes that are determined in advance, of a radiation image expressed by radiation that has passed through a subject of image capturing; an image processing section that carries out predetermined image processing on image information obtained by the image capturing by the radiation image capturing section; a power supply section that supplies electric power for driving to the radiation image capturing section; a connection portion that electrically connects to at least one of a power supply device, that is adapted to supply electric power for driving to the radiation image capturing section, and an image processing device, that carries out same sort of image processing as the image processing section; and a control section that effects control such that, in a case in which at least one of the power supply device and the image processing device is connected to the connection portion, a limitation on selection of the operation mode is relaxed, and effects control such that, in a case in which the power supply device is connected to the connection portion, the power supply device is used instead of the power supply section, and in a case in which the image processing device is connected to the connection portion, the image processing device is used instead of the image processing section.

In the radiation image capturing device of the fourth aspect of the present invention, in a case in which at least one of the power supply device and the image processing device that are provided at the exterior is connected to the connection portion, control is carried out such that limitations on the selection of the operation mode are relaxed, and control is carried out such that, in a case in which the power supply device is connected to the connection portion, the power supply device is used instead of the incorporated power supply section, and, in a case in which the image processing device is connected to the connection portion, the image processing device is used instead of the incorporated image processing section. Due thereto, the amount of generated heat can be suppressed without leading to the device becoming larger. On the other hand, an increase in costs and increased complexity of the device can be suppressed as compared with a technique in which a detachable cooling unit is readied at the radiation image capturing device.

In accordance with a fifth aspect of the present invention, in any of the above-described first through fourth aspects, in a case in which the control section has effected control such that at least one of the power supply device and the image processing device connected to the connection portion is used, the control section may effect control so as to reduce, as compared with before control, or so as to stop at least one of frequency of clock signals for synchronous control and electric power for driving that are supplied to the image processing section. Due thereto, the amount of generated heat can be suppressed more reliably.

In accordance with a sixth aspect of the present invention, in any of the above-described first through fifth aspects, the device may further include a transmitting section that, in a case in which neither the power supply device nor the image processing device is connected to the connection portion, wirelessly transmits the image information, that has been subjected to the image processing by the image processing section, to an external device. Due thereto, the portability can be improved.

In accordance with a seventh aspect of the present invention, in any of the above-described first through sixth aspects, the power supply section may have a battery, and a converting section that converts voltage of electric power supplied from the battery into voltages that are used at a destination of supply of the electric power. Due thereto, plural electric power supply destinations can be handled.

In accordance with an eighth aspect of the present invention, in any of the above-described first through seventh aspects, the image processing device may execute the image processing at a higher speed than the image processing section. Due thereto, in a case in which the image processing device is connected, higher-speed image processing can be realized as compared with a case in which the image processing device is not connected.

In accordance with a ninth aspect of the present invention, in any of the above-described first through eighth aspects, the plurality of operation modes may include a still image capturing mode and a video image capturing mode. Due thereto, the amount of heat generated at the time of image capturing in the operation mode, that is applied from among operation modes that include the still image capturing mode and the video image capturing mode, can be suppressed.

In accordance with a tenth aspect of the present invention, in any of the above-described first through ninth aspects, the radiation image capturing device may be structured as an electronic cassette. Due thereto, at the electronic cassette, the amount of generated heat can be suppressed without leading to an increase in costs and the device becoming more complex and larger.

In accordance with an eleventh aspect of the present invention, there is provided A radiation image capturing system including: (A) a radiation image capturing device including: a radiation image capturing section that is adapted to capture, in an operation mode selected from among a plurality of operation modes that are determined in advance, a radiation image expressed by radiation that has passed through a subject of image capturing, a power supply section that supplies electric power for driving to the radiation image capturing section, a connection portion that electrically connects to a power supply device that is adapted to supply electric power for driving to the radiation image capturing section, and a control section that effects control such that, in a case in which an operation mode that generates a predetermined generated heat amount or more has been selected as the operation mode and the power supply device is connected to the connection portion, the power supply device is used instead of the power supply section; and (B) the power supply device.

In the radiation image capturing system of the eleventh aspect of the present invention, control is carried out such that, in a case in which an operation mode that generates a predetermined generated heat amount or more has been selected as the operation mode and a power supply device that is provided at the exterior is connected to the connection portion, the power supply device is used instead of the incorporated power supply section. Due thereto, the amount of generated heat can be suppressed without leading to the device becoming larger. On the other hand, an increase in costs and increased complexity of the device can be suppressed as compared with a technique in which a detachable cooling unit is readied at the radiation image capturing device.

In accordance with a twelfth aspect of the present invention, there is provided a radiation image capturing system including: (A) a radiation image capturing device including: a radiation image capturing section that is adapted to capture, in an operation mode selected from among a plurality of operation modes that are determined in advance, of a radiation image expressed by radiation that has passed through a subject of image capturing, a power supply section that supplies electric power for driving to the radiation image capturing section, a connection portion that electrically connects to a power supply device that is adapted to supply electric power for driving to the radiation image capturing section, and a control section that, in a case in which the power supply device is connected to the connection portion, effects control such that a limitation on selection of the operation mode is relaxed, and effects control such that the power supply device is used instead of the power supply section; and (B) the power supply device.

In the radiation image capturing system of the twelfth aspect of the present invention, in a case in which a power supply device that is provided at the exterior is connected to the connection portion, control is carried out such that limitations on the selection of the operation mode are relaxed, and control is carried out such that the power supply device is used instead of the incorporated power supply section. Due thereto, the amount of generated heat can be suppressed without leading to the device becoming larger. On the other hand, an increase in costs and increased complexity of the device can be suppressed as compared with a technique in which a detachable cooling unit is readied at the radiation image capturing device.

In accordance with a thirteenth aspect of the present invention, in the above-described eleventh or twelfth aspect, the system may further include an instructing device that comprises an instruction transmitting section that transmits, to the radiation image capturing device, instruction information that instructs the operation mode, and the radiation image capturing device may further include a receiving section that receives the instruction information transmitted from the instruction transmitting section of the instructing device, and the control section may effect control such that, in a case in which the operation mode that is instructed by the instruction information received by the receiving section is an operation mode requiring use of the power supply device, and the power supply device is not connected to the connection portion, at least one of issuing of a warning and discontinuing of image capturing by the radiation image capturing section is carried out. Due thereto, the convenience of use can be improved even more.

In accordance with a fourteenth aspect of the present invention, there is provided a radiation image capturing system including: (A) a radiation image capturing device including: a radiation image capturing section that is adapted to capture, in an operation mode selected from among a plurality of operation modes that are determined in advance, of a radiation image expressed by radiation that has passed through a subject of image capturing, an image processing section that carries out predetermined image processing on image information that is obtained by the image capturing by the radiation image capturing section, a connection portion that electrically connects to an image processing device that carries out same sort of image processing as the image processing section, and a control section that effects control such that, in a case in which an operation mode that generates a predetermined generated heat amount or more has been selected as the operation mode and the image processing device is connected to the connection portion, the image processing device is used instead of the image processing section; and (B) the image processing device.

In the radiation image capturing system of the fourteenth aspect of the present invention, control is carried out such that, in a case in which an operation mode that generates a predetermined generated heat amount or more has been selected as the operation mode and an image processing device that is provided at the exterior is connected to the connection portion, the image processing device is used instead of the incorporated image processing section. Due thereto, the amount of generated heat can be suppressed without leading to the device becoming larger. On the other hand, an increase in costs and increased complexity of the device can be suppressed as compared with a technique in which a detachable cooling unit is readied at the radiation image capturing device.

In accordance with a fifteenth aspect of the present invention, there is provided A radiation image capturing system including: (A) a radiation image capturing device including: a radiation image capturing section that is adapted to capture, in an operation mode selected from among a plurality of operation modes that are determined in advance, of a radiation image expressed by radiation that has passed through a subject of image capturing, an image processing section that carries out predetermined image processing on image information that is obtained by the image capturing by the radiation image capturing section, a connection portion that electrically connects to an image processing device that carries out same sort of image processing as the image processing section, and a control section that, in a case in which the image processing device is connected to the connection portion, effects control such that a limitation on selection of the operation mode is relaxed, and effects control such that the image processing device is used instead of the image processing section; and (B) the image processing device.

In the radiation image capturing system of the fifteenth aspect of the present invention, in a case in which an image processing device that is provided at the exterior is connected to the connection portion, control is carried out such that limitations on the selection of the operation mode are relaxed, and control is carried out such that the image processing device is used instead of the incorporated image processing section. Due thereto, the amount of generated heat can be suppressed without leading to the device becoming larger. On the other hand, an increase in costs and increased complexity of the device can be suppressed as compared with a technique in which a detachable cooling unit is readied at the radiation image capturing device.

In accordance with a sixteenth aspect of the present invention, in the above-described fourteenth or fifteenth aspect, the system may further include an instructing device comprising an instruction transmitting section that transmits, to the radiation image capturing device, instruction information that instructs the operation mode, and the radiation image capturing device may further include a receiving section that receives the instruction information transmitted from the instruction transmitting section of the instructing device, and the control section may effect control such that, in a case in which the operation mode that is instructed by the instruction information received by the receiving section is an operation mode requiring use of the image processing device, and the image processing device is not connected to the connection portion, at least one of issuing of a warning and discontinuing of image capturing by the radiation image capturing section is carried out. Due thereto, the convenience of use can be improved even more.

In accordance with a seventeenth aspect of the present invention, there is provided a computer-readable medium storing a program causing a computer to execute control processing for controlling a radiation image capturing device, the radiation image capturing device including: a radiation image capturing section that is adapted to capture, in an operation mode selected from among a plurality of operation modes that are determined in advance, of a radiation image expressed by radiation that has passed through a subject of image capturing; an image processing section that carries out predetermined image processing on image information obtained by the image capturing by the radiation image capturing section; a power supply section supplying electric power for driving to the radiation image capturing section; and a connection portion electrically connecting to at least one of a power supply device, that is adapted to supply electric power for driving to the radiation image capturing section, and an image processing device, that carries out same sort of image processing as the image processing section, the control processing including: effecting control such that the power supply device is used instead of the power supply section in a case in which an operation mode that generates a predetermined generated heat amount or more has been selected as the operation mode and the power supply device is connected to the connection portion; and effecting control such that the image processing device is used instead of the image processing section in a case in which an operation mode that generates a predetermined generated heat amount or more has been selected as the operation mode and the image processing device is connected to the connection portion.

Accordingly, in accordance with the seventeenth aspect of the present invention, a computer can be made to operate similarly to the invention of the above-described first aspect. The amount of generated heat can be suppressed without leading to an increase in costs and the device becoming more complex and larger.

Further, in the seventeenth aspect of the present invention, a computer may be made to function as the control section of the above-described second through tenth aspects.

Embodiments of the present invention are described above, but the present invention is not limited to the embodiments as will be clear to those skilled in the art.

What is claimed is:

1. A radiation image capturing device comprising:
   a radiation image capturing section that is adapted to capture, in an operation mode selected from among a plurality of operation modes that are determined in advance, a radiation image expressed by radiation that has passed through a subject of image capturing;
   an image processing section that carries out predetermined image processing on image information obtained by image capturing by the radiation image capturing section;
   a power supply section that supplies electric power for driving to the radiation image capturing section;
   a connection portion that electrically connects to a power supply device, that is adapted to supply electric power for driving to the radiation image capturing section, an image processing device, that carries out a same type of image processing as the image processing section, or any combination thereof; and
   a control section that effects control such that, in a case in which an operation mode that generates a predetermined generated heat amount or more has been selected as the operation mode and the power supply device is connected to the connection portion, the power supply device is used instead of the power supply section, and, in a case in which an operation mode that generates a predetermined generated heat amount or more has been selected as the operation mode and the image processing device is connected to the connection portion, the image processing device is used instead of the image processing section.

2. The radiation image capturing device of claim 1, wherein the operation mode that generates a predetermined generated heat amount or more is an operation mode, in which an image capturing speed by the radiation image capturing section is greater than or equal to a predetermined image capturing speed, an operation mode in which a transfer speed of the image information is greater than or equal to a predetermined transfer speed, or any combination thereof.

3. The radiation image capturing device of claim 1, further comprising a detecting section that detects that the power supply device, the image processing device, or any combination thereof, is connected to the connection portion, wherein the control section effects control such that, in a case in which the detecting section detects that the power supply device is connected to the connection portion, the power supply device is used instead of the power supply section, and, in a case in which the detecting section detects that the image processing device is connected to the connection portion, the image processing device is used instead of the image processing section.

4. The radiation image capturing device of claim 1, wherein, in a case in which the control section has effected control such that the power supply device the image processing device, or any combination thereof, connected to the connection portion is used, the control section effects control so as to reduce, as compared with before control, or so as to stop, frequency of clock signals for synchronous control, electric power for driving, or any combination thereof, which are supplied to the image processing section.

5. The radiation image capturing device of claim 1, further comprising a transmitting section that, in a case in which neither the power supply device nor the image processing device is connected to the connection portion, wirelessly transmits the image information, that has been subjected to the image processing by the image processing section, to an external device.

6. The radiation image capturing device of claim 1, wherein the power supply section has a battery, and a converting section that converts voltage of electric power supplied from the battery into voltages that are used at a destination of supply of the electric power.

7. The radiation image capturing device of claim 1, wherein the image processing device executes the image processing at a higher speed than the image processing section.

8. The radiation image capturing device of claim 1, wherein the plurality of operation modes includes a still image capturing mode and a video image capturing mode.

9. The radiation image capturing device of claim 1, wherein the radiation image capturing device is structured as an electronic cassette.

10. A radiation image capturing device comprising:
- a radiation image capturing section that is adapted to capture, in an operation mode selected from among a plurality of operation modes that are determined in advance, a radiation image expressed by radiation that has passed through a subject of image capturing;
- an image processing section that carries out predetermined image processing on image information obtained by the image capturing by the radiation image capturing section;
- a power supply section that supplies electric power for driving to the radiation image capturing section;
- a connection portion that electrically connects to a power supply device, that is adapted to supply electric power for driving to the radiation image capturing section, an image processing device, that carries out a same type of image processing as the image processing section, or any combination thereof; and
- a control section that effects control such that, in a case in which the power supply device, the image processing device, or any combination thereof, is connected to the connection portion, a limitation on selection of the operation mode is relaxed, and that effects control such that, in a case in which the power supply device is connected to the connection portion, the power supply device is used instead of the power supply section, and in a case in which the image processing device is connected to the connection portion, the image processing device is used instead of the image processing section.

11. The radiation image capturing device of claim 10, wherein, in a case in which the control section has effected control such that the power supply device, the image processing device, or any combination thereof, connected to the connection portion is used, the control section effects control so as to reduce, as compared with before control, or so as to stop, frequency of clock signals for synchronous control, electric power for driving that are supplied to the image processing section, or any combination thereof.

12. The radiation image capturing device of claim 10, further comprising a transmitting section that, in a case in which neither the power supply device nor the image processing device is connected to the connection portion, wirelessly transmits the image information, that has been subjected to the image processing by the image processing section, to an external device.

13. The radiation image capturing device of claim 10, wherein the power supply section has a battery, and a converting section that converts voltage of electric power supplied from the battery into voltages that are used at a destination of supply of the electric power.

14. The radiation image capturing device of claim 10, wherein the image processing device executes the image processing at a higher speed than the image processing section.

15. The radiation image capturing device of claim 10, wherein the plurality of operation modes includes a still image capturing mode and a video image capturing mode.

16. The radiation image capturing device of claim 10, wherein the radiation image capturing device is structured as an electronic cassette.

17. A radiation image capturing system comprising:
(A) a radiation image capturing device comprising:
- a radiation image capturing section that is adapted to capture, in an operation mode selected from among a plurality of operation modes that are determined in advance, a radiation image expressed by radiation that has passed through a subject of image capturing,
- a power supply section that supplies electric power for driving to the radiation image capturing section,
- a connection portion that electrically connects to a power supply device that is adapted to supply electric power for driving to the radiation image capturing section, and
- a control section that effects control such that, in a case in which an operation mode that generates a predetermined generated heat amount or more has been selected as the operation mode and the power supply device is connected to the connection portion, a limitation on selection of the operation mode is relaxed and the power supply device is used instead of the power supply section; and
(B) the power supply device.

18. The radiation image capturing system of claim 17, further comprising an instructing device that comprises an instruction transmitting section that transmits, to the radiation image capturing device, instruction information that instructs the operation mode,
- wherein the radiation image capturing device further comprises a receiving section that receives the instruction information transmitted from the instruction transmitting section of the instructing device, and
- the control section effects control such that, in a case in which the operation mode that is instructed by the instruction information received by the receiving section is an operation mode requiring use of the power supply device, and the power supply device is not connected to the connection portion, at least one of issuing of a warning or discontinuing of image capturing by the radiation image capturing section is carried out.

19. A radiation image capturing system comprising:
(A) a radiation image capturing device comprising:
- a radiation image capturing section that is adapted to capture, in an operation mode selected from among a plurality of operation modes that are determined in advance, a radiation image expressed by radiation that has passed through a subject of image capturing,
- an image processing section that carries out predetermined image processing on image information that is obtained by the image capturing by the radiation image capturing section,
- a power supply section that supplies electric power for driving to the radiation image capturing section,
- a connection portion that electrically connects to an image processing device that carries out a same type of image processing as the image processing section, and
- a control section that effects control such that, in a case in which an operation mode that generates a predetermined generated heat amount or more has been selected as the operation mode, and a power supply device that is adapted to supply electric power for driving to the radiation image capturing section is connected to the connection portion, the power supply device is used instead of the power supply section, and, in a case in which an operation mode that generates a predetermined generated heat amount or more has been selected as the operation mode and the image processing device is connected to the connection portion, limitation on selection of the operation mode is relaxed and the image processing device is used instead of the image processing section; and
(B) the image processing device; and
(C) the power supply device.

20. The radiation image capturing system of claim 19, further comprising an instructing device comprising an instruction transmitting section that transmits, to the radiation image capturing device, instruction information that instructs the operation mode, wherein the radiation image capturing device further comprises a receiving section that receives the instruction information transmitted from the instruction transmitting section of the instructing device, and the control section effects control such that, in a case in which the operation mode that is instructed by the instruction information received by the receiving section is an operation mode requiring use of the image processing device, and the image processing device is not connected to the connection portion, at least one of issuing of a warning or discontinuing of image capturing by the radiation image capturing section is carried out.

\* \* \* \* \*